(12) United States Patent
Katsube et al.

(10) Patent No.: US 6,361,848 B1
(45) Date of Patent: *Mar. 26, 2002

(54) ORGANIC AND INORGANIC COMPLEX COMPOUND AND SWITCH USING SAME

(75) Inventors: Shunichi Katsube; Tosikazu Uemoto; Kenichi Nishina; Kazunori Fukuya; Shinji Yamagata; Satoru Yamasaki, all of Fukuyama; Mitsugu Takahashi, Amagasaki; Kazuharu Kato, Amagasaki; Takao Mitsuhashi, Amagasaki; Hiroshi Adachi, Amagasaki; Shoji Yamaguchi, Amagasaki; Itsuo Nishiyama, Amagasaki; Fumiaki Baba, Amagasaki, all of (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/251,746

(22) Filed: Feb. 18, 1999

Related U.S. Application Data

(60) Continuation of application No. 08/855,614, filed on May 13, 1997, now abandoned, which is a division of application No. 08/492,523, filed on Jun. 20, 1995, now abandoned.

(30) Foreign Application Priority Data

Dec. 19, 1994 (JP) .............................................. 6-314938

(51) Int. Cl.[7] .............................................. H01H 83/00

(52) U.S. Cl. .............................. 428/70; 428/68; 428/76; 428/475.2; 428/475.5; 335/6; 200/293; 200/401; 218/158

(58) Field of Search .............................. 428/68, 70, 76, 428/474.4, 474.7, 474.9, 475.2, 475.5, 475.8, 477.7, 480; 252/609; 335/6; 200/293, 244, 401; 218/158

(56) References Cited

U.S. PATENT DOCUMENTS 2,692,252 A  * 10/1954  Falck .......................... 524/596
3,240,736 A  *  3/1966  Beckwith ....................... 524/2

(List continued on next page.)

FOREIGN PATENT DOCUMENTS

BE         676580 A       8/1966
CA         756251     *   4/1967

(List continued on next page.)

OTHER PUBLICATIONS

Hewley's condensed chemical Dictionary, Tenth Edition, Edited by Sax & Lewis, Jr. (Van nostrand Reinhold Co., NY, NY, copyright date 1987) pp. 42, 717, and 721, 1987.*

Scudamore, M.J., "Fire Performance Studies on Glass–reinforced Plastic Laminates." Fire and Materials, vol. 18, No. 5, Sep. 1, 1994, pp. 313–325.

(List continued on next page.)

*Primary Examiner*—Blaine Copenheaver
*Assistant Examiner*—Alicia Chevalier
(74) *Attorney, Agent, or Firm*—Burns, Doane, Swecker & Mathis, LLP

(57) ABSTRACT

A switch having a molded article of which the entirety or a part is composed of an organic and inorganic complex composition is provided, wherein the base inside of the base of a box is composed of for example an organic and inorganic complex composition with the resin content at 15 to 70 wt % and the content of one or more inorganic compounds capable of dehydration at 150° C. or more at 80 to 30 wt %.

20 Claims, 10 Drawing Sheets

U.S. PATENT DOCUMENTS

| | | | | |
|---|---|---|---|---|
| 3,786,041 A | * | 1/1974 | Talsma | 524/35 |
| 3,912,671 A | * | 10/1975 | Kondo et al. | 524/436 |
| 4,533,687 A | * | 8/1985 | Itoh et al. | 524/80 |
| 4,668,718 A | * | 5/1987 | Schreiber | 523/451 |
| 4,939,195 A | * | 7/1990 | Ishino et al. | 524/185 |
| 4,948,828 A | * | 8/1990 | Johnson et al. | 524/437 |
| 5,147,918 A | * | 9/1992 | Price | 524/442 |
| 5,153,247 A | * | 10/1992 | Okamura et al. | 524/101 |
| 5,166,651 A | * | 11/1992 | Jacobs et al. | 335/202 |
| 5,216,063 A | * | 6/1993 | Williams | 524/414 |
| 5,283,542 A | * | 2/1994 | Ochiai et al. | 335/6 |
| 5,290,835 A | * | 3/1994 | Hatayama et al. | 524/109 |
| 5,312,941 A | * | 5/1994 | Razvan et al. | 556/179 |
| 5,369,183 A | * | 11/1994 | Okada et al. | 525/289 |
| 5,401,442 A | * | 3/1995 | Miyata | 252/609 |
| 5,444,809 A | * | 8/1995 | Aoki et al. | 385/128 |
| 5,463,199 A | * | 10/1995 | Divincenzo et al. | 218/158 |
| 5,494,718 A | * | 2/1996 | Adams et al. | 428/35.7 |
| 5,841,088 A | * | 11/1998 | Yamaguchi et al. | 218/158 |

FOREIGN PATENT DOCUMENTS

| | | | | |
|---|---|---|---|---|
| CH | | 356809 A | | 10/1961 |
| EP | | 0 181 832 A | | 5/1986 |
| EP | | 0278555 A1 | * | 2/1988 |
| EP | | 0 278 555 A1 | * | 8/1988 |
| EP | | 0 278 559 A2 | * | 8/1988 |
| EP | | 0 430 350 A1 | * | 6/1991 |
| FR | | 2 209 803 A | | 7/1974 |
| GB | | 1053270 | * | 12/1966 |
| JP | | 56-34961 | | 8/1981 |
| JP | | 02-125943 U | * | 10/1990 |
| JP | | 5-271542 | | 10/1993 |
| JP | | 6-57792 | | 8/1994 |
| JP | | 6-234913 | | 8/1994 |
| JP | | 6-279673 | | 10/1994 |
| WO | | WO 95/28439 | * | 10/1995 |

OTHER PUBLICATIONS

Simionescu, C.I. et al., "Lignin/Epoxy Composites." Composites Science and Technology, vol. 48, Jan. 1, 1993, pp. 317–323.

Database WPI, Section Ch, Week 9116, Derwent Publications Ltd., London, GB; AN 91–114494 XP002061234 & JP 03 056 558 A (Hitachi Chem Co Ltd), Mar. 12, 1991 (Abstract).

Patent Abstracts of Japan, vol. 015, No. 413 (C–0877), Oct. 22, 1991 & JP 03 170356 A (Hitachi Chem Co Ltd), Jul. 23, 1991 (Abstract).

Scudamore, M.J., "Fire Performance Studies on Glass–reinforced Plastic Laminates." Fire and Materials, vol. 18, No. 5, Sep. 1, 1994, pp. 313–325.*

Simionescu, C.I. et al., "Lignin/Epoxy Composites." Composites Science and Technology, vol. 48, Jan. 1, 1993, pp. 317–323.*

Database WPI, Section Ch, Week 9116, Derwent Publications Ltd., London, GB; AN 91–114494 XP002061234 & JP 03 056 558 A (Hitachi Chem Co Ltd), Mar. 12, 1991 (Abstract).*

Patent Abstracts of Japan, vol. 015, No. 413 (C–0877), Oct. 22, 1991 & JP 03 170356 A (Hitachi Chem Co Ltd), Jul. 23, 1991 (Abstract).*

* cited by examiner

ORGANIC AND INORGANIC COMPLEX COMPOUND AND SWITCH USING SAME

This application is a continuation of application Ser. No. 08/855,614 abandoned, filed on May 13, 1997, which is a divisional of application Ser. No. 08/492,523, filed on Jun. 20, 1995 abandoned.

BACKGROUND OF THE INVENTION

1. Field of the Invention

The present invention relates to an organic and inorganic complex compound with flame retardancy and a switch using the same.

2. Prior Art

It has been described conventionally, in for example Japanese Utility Model Laid-Open No. 2-125943, a flame retardant material containing polyester, glass fiber, calcium carbonate, aluminium hydroxide, a halogen flame retardant, and antimony oxide.

The aforementioned flame retardant material has satisfactory flame retardancy. Because the material contains a halogen flame retardant, however, the material has problems in that the halogen flame retardant is deposited over time from the material and corrodes metal parts when the material is used as a structural material. Particularly when the material is used for switches and the like, problems occur such as poor continuity due to corrosion of contacts and corrosion of electronic parts. Also, a problem is remarked in that the flame retardant material is expensive as such materials.

It has been believed conventionally that the decrease of insulation after arc generation in switches is due to the deposition of carbon from thermal decomposition into peripheral regions with the center located in an arc extinguishing chamber.

However, the present inventors have made detailed analysis of the deposits inside switches. Consequently, the inventors have found that a metal layer composed of the free carbon, metals in sublimation and melt metal liquid droplets in dispersion, both generating from a contact and a metallic component part inside switches during the opening and closing of the electrodes of the switches, is formed and the deposited metal layer has greater contribution to the decrease in insulation resistance. Additionally, the inventors have found that free carbon is generated from handles, cross bars, trip bars, and portions apart from an arc extinguishing chamber in addition to the peripheral regions with the center localized in the arc extinguishing chamber.

Therefore, the suppression of the deposition of free carbon as a conventional countermeasure is unsatisfactory for the insulating function after the opening and closing of the electrodes of switches, which is a serious problem so as to design compaction of switches and assembly thereof for a larger capacity with a higher shut off.

SUMMARY OF THE INVENTION

The present invention has been carried out so as to overcome these problems, and the first objective of the present invention resides in providing a highly flame-retardant organic and inorganic complex composition without depositing components capable of corroding metals.

The second objective of the present invention is to provide a switch with higher insulation, which can prevent the decrease in insulation after arc generation by insulating free carbon and metals in sublimation and melt metal liquid droplets, generating after arc generation in switches with gas capable of decomposition, which gas is generated from a molded article composed of an organic and inorganic complex composition.

Another objective of the present invention is to provide an organic and inorganic complex composition wherein the resin content is at 15 to 70 wt % and the content of one or more inorganic compounds capable of dehydration at 150° C. or more is at 80 to 30 wt %.

Still another objective of the present invention is to provide an organic and inorganic complex composition wherein the resin content is at 15 to 65 wt % and the content of one or more inorganic compounds capable of dehydration at 150° C. or more is at 80 to 30 wt %, and wherein the content of one or more reinforcing agents is at 5 to 55 wt %.

Furthermore, an objective of the present invention is to provide an organic and inorganic complex composition wherein the content of a thermoplastic resin is at 35 to 80 wt % and the content of one or more inorganic compounds capable of dehydration at 200° C. or more is at 50 to 15 wt %, and wherein the content of one or more reinforcing agents is at 5 to 50 wt %.

Additional objective of the present invention is to provide an organic and inorganic complex composition wherein the content of a thermoplastic resin is at 35 to 80 wt % and the content of one or more inorganic compounds capable of dehydration at 250° C. or more is at 50 to 15 wt %, and wherein the content of one or more reinforcing agents is at 5 to 50 wt %.

Still another objective of the present invention is to provide an organic and inorganic complex composition wherein the content of a thermoplastic resin is at 35 to 80 wt % and the content of one or more inorganic compounds capable of dehydration at 340° C. or more is at 50 to 15 wt %, and wherein the content of one or more reinforcing agents is at 5 to 50 wt %.

DESCRIPTION OF THE PREFERRED EMBODIMENTS

EXAMPLE 1

Figure 1:
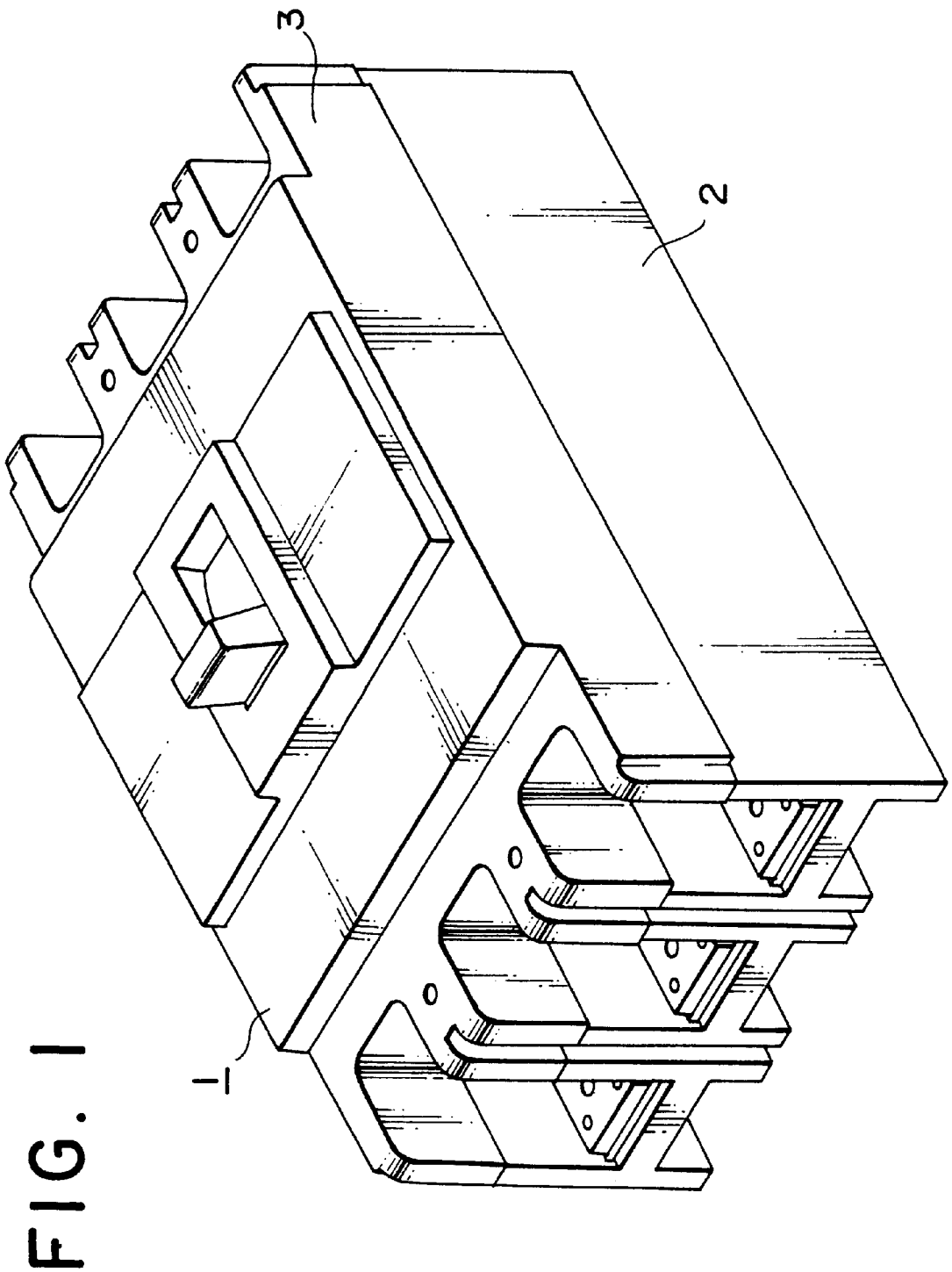
FIG. 1 is a schematic perspective view depicting the appearance of a circuit breaker in accordance with the present invention.

The organic and inorganic complex composition of the present invention contains one or more inorganic compounds capable of dehydration at 150° C. or more and one or more reinforcing materials and thermosetting resins.

Preferably, if the resin is an epoxy resin, the content of the epoxy resin is at 15 to 65 wt %, and the content of one or more inorganic compounds capable of dehydration at 150° C. or more is at 80 to 30 wt %, and the content of the reinforcing material is at 5 to 55 wt %. If the content of one or more inorganic compounds capable of dehydration at 150° C. or more is below 30 wt %, or if the content of the reinforcing material is above 55 wt %, it is observed the tendency such that the flame retardancy is unsatisfactory. If the content of one or more inorganic compounds capable of dehydration at 150° C. or more is above 80 wt %, or if the content of the reinforcing material is below 5 wt %, it is observed the tendency such that the pressure proof strength is unsatisfactory.

EXAMPLE 2

If the resin is polyester, it is preferable that the content of the polyester is at 15 to 40 wt %, and the content of one or more inorganic compounds capable of dehydration at 150° C. or more is at 80 to 35 wt %, and the content of the reinforcing material is at 5 to 50 wt %. If the content of one or more inorganic compounds capable of dehydration at 150° C. or more is below 35 wt %, or if the content of the reinforcing material is above 50 wt %, it is observed the tendency such that the flame retardancy is unsatisfactory. If the content of one or more inorganic compounds capable of dehydration at 150° C. or more is above 80 wt %, or if the content of the reinforcing material is below 5 wt %, it is observed the tendency such that the pressure proof strength is unsatisfactory.

EXAMPLE 3

If the resin is a phenol resin, it is preferable that the content of the phenol resin is at 25 to 60 wt %, and the content of one or more inorganic compounds capable of dehydration at 150° C. or more is at 70 to 35 wt %, and the content of the reinforcing material is at 5 to 40 wt %. If the content of one or more inorganic compounds capable of dehydration at 150° C. or more is below 35 wt %, or if the content of the reinforcing material is above 40 wt %, it is observed the tendency such that the flame retardancy is unsatisfactory. If the content of one or more inorganic compounds capable of dehydration at 150° C. or more is above 70 wt %, or if the content of the reinforcing material is below 5 wt %, it is observed the tendency such that the pressure proof strength is unsatisfactory.

EXAMPLE 4

If the resin is one of urea resins, melamine resins, melamine phenol resins, and diallylphthalate resins, it is preferable that the content of the resin is at 30 to 65 wt % and the content of one or more inorganic compounds capable of dehydration at 150° C. or more is at 65 to 30 wt %, and the content of the reinforcing material is at 5 to 40 wt %. If the content of one or more inorganic compounds capable of dehydration at 150° C. or more is below 30 wt %, or if the content of the reinforcing material is above 40 wt %, it is observed the tendency such that the flame retardancy is unsatisfactory. If the content of one or more inorganic compounds capable of dehydration at 150° C. or more is above 65 wt %, or if the content of the reinforcing material is below 5 wt %, it is observed the tendency such that the pressure proof strength is unsatisfactory.

EXAMPLE 5

The organic and inorganic complex composition in accordance with the present invention contains one or more inorganic compounds capable of dehydration at 200° C. or more, and one or more reinforcing materials and thermoplastic resins.

If the resin is one of polyacetal and polyacetal polymer alloy, preferably, the content of the resin is at 65 to 80 wt % and the content of one or more inorganic compounds capable of dehydration at 200° C. or more is at 30 to 15 wt %, and the content of the reinforcing material is at 5 to 20 wt %. If the content of one or more inorganic compounds capable of dehydration at 200° C. or more is below 15 wt %, or if the content of the reinforcing material is above 20 wt %, it is observed the tendency such that the flame retardancy is unsatisfactory. If the content of one or more inorganic compounds capable of dehydration at 200° C. or more is above 30 wt %, or if the content of the reinforcing material is below 5 wt %, it is observed the tendency such that the pressure proof strength is unsatisfactory.

EXAMPLE 6

The organic and inorganic complex composition in accordance with the present invention contains one or more inorganic compounds capable of dehydration at 250° C. or more, and one or more reinforcing materials and thermoplastic resins.

If the resin is one of polybutylene terephthalate, Nylon 6, and Nylon MXD 6, or if the resin is the polymer alloy thereof, it is preferable that the content of the resin is at 45 to 80 wt %, and the content of one or more inorganic compounds capable of dehydration at 250° C. or more is at 50 to 15 wt %, and the content of the reinforcing material is at 5 to 40 wt %. If the content of one or more inorganic compounds capable of dehydration at 250° C. or more is below 15 wt %, or if the content of the reinforcing material is above 40 wt %, it is observed the tendency such that the flame retardancy is unsatisfactory. If the content of one or more inorganic compounds capable of dehydration at 250° C. or more is above 50 wt %, or if the content of the reinforcing material is below 5 wt %, it is observed the tendency such that the pressure proof strength is unsatisfactory.

EXAMPLE 7

The organic and inorganic complex composition in accordance with the present invention contains one or more inorganic compounds capable of dehydration at 340° C. or more, and one or more reinforcing materials and thermoplastic resins.

If the resin is one of polyethylene terephthalate, Nylon 66, polyphenylene sulfide, Nylon 46, and Nylon 6T or if the resin is the polymer alloy thereof, it is preferable that the content of the resin is at 35 to 80 wt %, and the content of one or more inorganic compounds capable of dehydration at 340° C. or more is at 45 to 15 wt %, and the content of the reinforcing material is at 5 to 50 wt %. If the content of one or more inorganic compounds capable of dehydration at 340° C. or more is below 15 wt %, or if the content of the reinforcing material is above 50 wt %, it is observed the tendency such that the flame retardancy is unsatisfactory. If the content of one or more inorganic compounds capable of dehydration at 340° C. or more is above 45 wt %, or if the content of the reinforcing material is below 5 wt %, it is observed the tendency such that the pressure proof strength is unsatisfactory.

According to Examples 1 to 7, the inorganic compounds contained in the organic and inorganic complex composition generate steam by thermal decomposition when the organic and inorganic complex composition is exposed to combustion, and the steam suppresses such combustion. Concurrently, combustion heat is deprived through the endothermic reaction during the steam generation.

More specifically, when the organic and inorganic complex composition is exposed to combustion, the temperature of the composition gradually rises to decompose organic polymers, and at temperatures of about 150 to 380° C. prior to the combustion of decomposition gases at about 400 to 600° C., the inorganic compounds capable of dehydration at 150° C. or more are subjected to thermal decomposition to consequently generate steam as an incombustible gas. Concurrently, combustion heat is deprived through the endothermic reaction during steam generation, whereby the organic and inorganic complex composition has excellent flame retardancy.

At temperatures for general use, no deposit occurs because the organic and inorganic complex composition does not contain a halogen flame retardant, and therefore, metal corrosion is not induced.

In the aforementioned examples, examples of the inorganic compounds capable of dehydration at 150° C. or more include zinc borate ($2ZnO, 3B_2O_3, 3.5H_2O$), dosonite ($NaAl(OH)_2CO_3$), aluminium hydroxide ($Al(OH)_3$), calcium hydroxide ($Ca(OH)_2$), calcium aluminate ($Ca_3Al_2(OH)_{12}$), magnesium hydroxide ($Mg(OH)_2$), hydrotarsites ($Mg_4Al(OH)_{12}CO_3\ 3H_2O$), basic magnesium carbonate ($Mg_4(CO_3)_3(OH)_2\ 4H_2O$), polyphosphate ammonium (($NH_4PO_3$)n) and the like. These have forms in particles, fiber and flake.

Among them, preference is given to dosonite, aluminium hydroxide, calcium hydroxide, calcium aluminate, magnesium hydroxide, hydrotarsite, and basic magnesium carbonate in terms of no toxicity.

Furthermore, preference is given to aluminium hydroxide (470 cal/g), calcium aluminate (340 cal/g), magnesium hydroxide (320 cal/g), and basic magnesium carbonate (295 cal/g) from the respect that the endotherm is relatively great during dehydration reaction.

When a thermosetting resin is contained, preference is given to aluminium hydroxide because it has an appropriate viscosity as a molding material.

When kneading is effected with a thermoplastic resin, the temperature for dehydration of the inorganic compounds is preferably above 200° C. so as to prevent the dehydration of the inorganic compounds during kneading.

The inorganic compounds capable of dehydration at 200° C. or more include zinc borate, dosonite, aluminium hydroxide, calcium hydroxide, calcium aluminate, magnesium hydroxide, basic magnesium hydroxide and the like.

The inorganic compounds capable of dehydration at 250° C. or more include zinc borate, calcium hydroxide, calcium aluminate, magnesium hydroxide, and the like.

The inorganic compounds capable of dehydration at 340° C. or more include calcium hydroxide, magnesium hydroxide, and the like. Among them, preference is given to calcium hydroxide, calcium aluminate, and magnesium hydroxide from the respect of no toxicity.

The inorganic compounds generating hydrogen may be used singly or may be used in combination with two or more thereof.

The average particle size of the inorganic compounds generating hydrogen is without specific limitation.

EXAMPLE 8

A molded article composed of the organic and inorganic complex composition to be used in a switch of the present invention contains one or more inorganic compounds capable of dehydration at 150° C. or more and one or more reinforcing materials and thermoplastic resins.

Preferably, if the resin is an epoxy resin, the content of the epoxy resin is at 15 to 65 wt %, and the content of one or more inorganic compounds capable of dehydration at 150° C. or more is at 80 to 30 wt %, and the content of the reinforcing material is at 5 to 55 wt %. If the content of one or more inorganic compounds capable of dehydration at 150° C. or more is below 30 wt %, or if the content of the reinforcing material is above 55 wt %, it is observed the tendency such that the insulation properties after opening and closing the electrodes of the switch is unsatisfactory. If the content of one or more inorganic compounds capable of dehydration at 150° C. or more is above 80 wt %, or if the content of the reinforcing material is below 5 wt %, it is observed the tendency such that the pressure proof strength is unsatisfactory.

EXAMPLE 9

Preferably, if the resin is polyester, the content of the polyester is at 15 to 40 wt %, and the content of one or more inorganic compounds capable of dehydration at 150° C. or more is at 80 to 35 wt %, and the content of the reinforcing material is at 5 to 50 wt %. If the content of one or more inorganic compounds capable of dehydration at 150° C. or more is below 35 wt %, or if the content of the reinforcing material is above 50 wt %, it is observed the tendency such that the insulation properties after opening and closing the electrodes of the switch is unsatisfactory. If the content of one or more inorganic compounds capable of dehydration at 150° C. or more is above 80 wt %, or if the content of the reinforcing material is below 5 wt %, it is observed the tendency such that the pressure proof strength is unsatisfactory.

EXAMPLE 10

If the resin is a phenol resin, it is preferable that the content of the phenol resin is at 25 to 60 wt %, and the content of one or more inorganic compounds capable of dehydration at 150° C. or more is at 70 to 35 wt %, and the content of the reinforcing material is at 5 to 40 wt %. If the content of one or more inorganic compounds capable of dehydration at 150° C. or more is below 35 wt %, or if the content of the reinforcing material is above 40 wt %, it is observed the tendency such that the insulation properties after opening and closing the electrodes of the switch is unsatisfactory. If the content of one or more inorganic compounds capable of dehydration at 150° C. or more is above 70 wt %, or if the content of the reinforcing material is below 5 wt %, it is observed the tendency such that the pressure proof strength is unsatisfactory.

EXAMPLE 11

If the resin is one of urea resins, melamine resins, melamine phenol resins, and diallylphthalate resins, it is preferable that the content of the resin is at 30 to 65 wt %, and the content of one or more inorganic compounds capable of dehydration at 150° C. or more is at 65 to 30 wt %, and the content of the reinforcing material is at 5 to 40 wt %. If the content of one or more inorganic compounds capable of dehydration at 150° C. or more is below 30 wt %, or if the content of the reinforcing material is above 40 wt %, it is observed the tendency such that the insulation properties after opening and closing the electrodes of the switch is unsatisfactory. If the content of one or more inorganic compounds capable of dehydration at 150° C. or more is above 65 wt %, or if the content of the reinforcing material is below 5 wt %, it is observed the tendency such that the pressure proof strength is unsatisfactory.

EXAMPLE 12

A molded article composed of the organic and inorganic complex composition to be used in a switch of the present invention contains one or more inorganic compounds capable of dehydration at 200° C. or more and one or more reinforcing materials and thermoplastic resins.

If the resin is one of polyacetal and polyacetal polymer alloy, it is preferable that the content of the resin is at 65 to 80 wt %, and the content of one or more inorganic compounds capable of dehydration at 200° C. or more is at 30 to 15 wt %, and the content of the reinforcing material is at 5 to 20 wt %. If the content of one or more inorganic compounds capable of dehydration at 200° C. or more is below 15 wt %, or if the content of the reinforcing material is above 20 wt %, it is observed the tendency such that the insulation properties after opening and closing the electrodes of the switch is unsatisfactory. If the content of one or more inorganic compounds capable of dehydration at 200° C. or more is above 30 wt %, or if the content of the reinforcing material is below 5 wt %, it is observed the tendency such that the pressure proof strength is unsatisfactory.

EXAMPLE 13

A molded article composed of the organic and inorganic complex composition to be used in a switch of the present invention contains one or more inorganic compounds capable of dehydration at 250° C. or more and one or more reinforcing materials and thermoplastic resins.

If the resin is one of polybutylene terephthalate, Nylon 6, and Nylon MXD 6, or if the resin is the polymer alloy thereof, it is preferable that the content of the resin is at 45 to 80 wt %, and the content of one or more inorganic compounds capable of dehydration at 250° C. or more is at 50 to 15 wt %, and the content of the reinforcing material is at 5 to 40 wt %. If the content of one or more inorganic compounds capable of dehydration at 250° C. or more is below 15 wt %, or if the content of the reinforcing material is above 40 wt %, it is observed the tendency such that the insulation properties after opening and closing the electrodes of the switch is unsatisfactory. If the content of one or more inorganic compounds capable of dehydration at 250° C. or more is above 50 wt %, or if the content of the reinforcing material is below 5 wt %, it is observed the tendency such that the pressure proof strength is unsatisfactory.

EXAMPLE 14

A molded article composed of the organic and inorganic complex composition to be used in a switch of the present invention contains one or more inorganic compounds capable of dehydration at 340° C. or more and one or more reinforcing materials and thermoplastic resins.

If the resin is one of polyethylene terephthalate, Nylon 66, polyphenylene sulfide, Nylon 46, and Nylon 6T or if the resin is the polymer alloy thereof, it is preferable that the content of the resin is at 35 to 80 wt %, and the content of one or more inorganic compounds capable of dehydration at 340° C. or more is at 45 to 15 wt %, and the content of the reinforcing material is at 5 to 50 wt %. If the content of one or more inorganic compounds capable of dehydration at 340° C. or more is below 15 wt %, or if the content of the reinforcing material is above 50 wt %, it is observed the tendency such that the insulation properties after opening and closing the electrodes of the switch is unsatisfactory. If the content of one or more inorganic compounds capable of dehydration at 340° C. or more is above 45 wt %, or if the content of the reinforcing material is below 5 wt %, it is observed the tendency such that the pressure proof strength is unsatisfactory.

According to Examples 7 to 14, when arc is generated between contacts during opening and closing of the electrodes of the switch, free carbon generated via the arc from the box of the switch and the organic materials constituting the inside of the switch, and metals in sublimation and melt metal liquid droplets in dispersion, generated via the arc from the contacts and the metallic materials constituting the inside of the switch, are insulated with gas to provide insulation, which gas is generated from the inorganic compounds through dehydration via the arc.

At the opening and closing of the electrodes of the switch, arc is generated between the contacts of the electrodes, so that the temperature generally rises up to about 400° C. to 6,000° C. Consequently, the electrodes, the contacts and the metallic materials constituting the inside of the switch are heated, whereby metallic steam and melt metal liquid droplets are generated and dispersed. Then, not only the arc but also such metallic steam and melt metal liquid droplets decompose the box of the switch and the organic materials constituting the inside of the switch to generate free carbon. Also, gas to provide insulation is generated from the inorganic compounds contained in the molded articles composed of the organic and inorganic complex composition.

Herein, the term "gas to provide insulation" means the gas having the property to insulate free carbon, metallic steam and melt metal liquid droplets.

When gas capable of reacting with the free carbon, the metallic steam and the meld metal droplets is generated, the gas reacts with the free carbon, the metallic steam and the melt metal liquid droplets to disperse reaction products of the gas with the free carbon, metallic steam and melt metal liquid droplets. As has been described above, insulated matters and those initially having insulating properties are deposited on the inner surface of the box of the switch and the surface of the inner components of the switch.

Thus, free carbon, metallic steam and melt metal liquid droplets with larger contribution to the decrease in electric resistance are insulated to prevent the decrease in electric resistance, thereby suppressing the decrease of insulation after arc generation.

When free carbon, metallic steam and melt metal liquid droplets are insulated, the generated gas to provide insulation cannot get close to the contacts because high-pressure steam is generated and expanded via the arc, so that an layer of insulated free carbon, metallic steam and melt metal liquid droplets is not formed near the contacts, whereby continuity cannot be blocked.

Examples of the inorganic compounds capable of dehydration at 150° C. or more include zinc borate ($2ZnO$, $3B_2O_3$, $3.5H_2O$), dosonite ($NaAl(OH)_2CO3$), aluminium hydroxide ($Al(OH)_3$), calcium hydroxide ($Ca(OH)_2$), calcium aluminate ($Ca_3Al_2(OH)_{12}$), magnesium hydroxide ($Mg(OH)_2$), hydrotarsites ($Mg_4Al(OH)_{12}CO_3\ 3H_2O$), basic magnesium carbonate ($Mg_4(CO_3)_3(OH)_2\ 4H_2O$), polyphosphate ammonium (($NH_4PO_3$)n) and the like. These have forms in particles, fiber and flake.

Because these inorganic compounds are not capable of dehydration when the temperature is not 150° C. or more, the compounds do not decompose if contained in a thermosetting resin to be molded around about 140° C. as the mold temperature. Therefore, molded articles therefrom can satisfactorily exhibit the role as the composition of an insulating material for extinction of arc.

Among them, preference is given to dosonite, aluminium hydroxide, calcium hydroxide, calcium aluminate, magnesium hydroxide, hydrotarsites, and basic magnesium carbonate, from the respect of no toxicity.

When kneading is effected with a thermoplastic resin, aluminium hydroxide is preferable because it has an appropriate viscosity as a molding material.

When kneading is effected with a thermoplastic resin, the temperature for dehydration of the inorganic compounds is preferably above 200° C. so as to prevent the dehydration of the inorganic compounds during kneading. More preferably, the temperature is 250° C. or more. Most preferably, the temperature is 340° C. or more.

Examples of the inorganic compounds capable of dehydration at 200° C. or more include zinc borate, dosonite, aluminium hydroxide, calcium hydroxide, calcium aluminate, magnesium hydroxide, basic magnesium carbonate, and the like.

Examples of the inorganic compounds capable of dehydration at 250° C. or more include zinc borate, calcium hydroxide, calcium aluminate, magnesium hydroxide, and the like.

Examples of the inorganic compounds capable of dehydration at 340° C. or more include calcium hydroxide, magnesium hydroxide, and the like.

Among them, preference is given to calcium hydroxide, calcium aluminate, and magnesium hydroxide from the respect of no toxicity.

The inorganic compounds generating gas to provide insulation, which gas is capable of reacting with free carbon, metallic steam and melt metal liquid droplets, may be used singly or in combination of two or more thereof.

The average particle size of the inorganic compounds generating the gas to provide insulation is without specific limitation.

The reinforcing material to be used in the Examples 1 to 14 will be explained hereinbelow. The reinforcing material means one or more selected from the group consisting of glass fiber, inorganic minerals, ceramic fiber and the like.

The reinforcing material is used for improving pressure proof strength and arc extinguishing potency.

In the reinforcing material, the total content of a metal compound in the form of $M_2O$ ($Na_2O$, $Li_2O$, etc.) from the periodic table 1A metals (Li, Na, K, Rb, Cs, Fr) is 1% or less. When the content is above 1%, the arc extinguishing potency is deteriorated. Preferably, the total content of the metal compounds should be 0.6% or less, more preferably, 0.15% or less.

Glass fiber means a fiber-like matter composed of glass, and is not specifically limited as far as the total content of the metal compounds from the periodic table 1A metals is satisfactory. Such glass material includes E glass, S glass, D glass, T glass and silica glass.

Glass fiber products include long fiber, short fiber or glass wool. As the reinforcing material for a thermoplastic resin, preference is given to short fiber. The reinforcing material for a thermosetting resin is without specific limitation, but when the material is used for polyester resin in the form of sheet, long fiber is specifically preferable because the fiber is not readily cut at the process of material production and so as to improve pressure proof strength of molded articles.

Preferably, the diameter of the glass fiber is 6 to 13 lm and the aspect ratio is 10 or more, from the respect of pressure proof strength. From the respect of pressure proof strength, also, the glass fiber is preferably processed with a processing agent such as a silane coupling agent.

Specific examples of inorganic minerals include calcium carbonate, clay, talc, mica, barium peroxide, aluminium oxide, zircon, cordierite, mullite, warastnite, white mica, magnesium carbonate, dolomite, magnesium sulfate, aluminium sulfate, potassium sulfate, barium sulfate, zinc fluoride, magnesium fluoride, and the like, with advantages such as the improvement of thermal deformation temperature and dimensional stability.

From the respect of the requirement of the total amount of metal compounds from the periodic table 1A, preference is given to calcium carbonate, talc, warastnite, barium peroxide, aluminium oxide, magnesium carbonate, magnesium sulfate, aluminium sulfate, potassium sulfate, barium sulfate, zinc fluoride, magnesium fluoride, and the like.

From the respect of pressure proof strength, calcium carbonate is preferably modified with a surface modifier such as fatty acid including stearic acid, so as to improve the dispersibility into a resin.

Ceramic fiber means ceramic fiber-like materials, without specific limitation as long as the total amount of metal compounds from the periodic table 1A is satisfactory. Specific examples of ceramic fiber include aluminium silicate fiber, aluminium borate fiber, aluminium borate whisker, alumina whisker and the like, from the respect of the improvement of arc extinguishing potency and pressure proof strength.

Preferably, the diameter of ceramic fiber is 1 to 10 lm and the aspect ratio is 10 or more from the respect of pressure proof strength.

As the reinforcing material, one or two or more thereof may be used. When two or more thereof are to be used, combinations of the glass fiber with the inorganic mineral, the glass fiber with the ceramic fiber, the inorganic mineral with the ceramic fiber, the glass fiber with another glass fiber, the inorganic mineral with another inorganic mineral, the ceramic fiber with another ceramic . fiber, and the combination of the glass fiber, the inorganic mineral and the ceramic fiber, are suggested without specific limitation, but the combination of the glass fiber with the inorganic mineral is advantageous in that the raw materials are not costly.

Then, resins will now be explained. The resin is a thermosetting resin or a thermoplastic resin.

The thermosetting resin is one selected from the group consisting of urea resins, melamine resins, melamine phenol resins, diallylphthalate resins, phenol resins and polyester resins.

The thermosetting resin is used so as to improve pressure proof strength, heat-resistant form retention, and arc extinguishing potency.

Urea resins and melamine resins are used because they do not have aromatic rings so that arc extinguishing potency can be elevated and heat-resistant form retention is satisfied.

Melamine phenol resins are used, because the resins have melamine in the structures thereof so that arc extinguishing potency can be improved and pressure proof strength and heat-resistant form retention are satisfactory simultaneously.

Diallylphthalate resins are used so as to improve pressure proof strength and heat-resistant form retention. As the reinforcing material, glass fiber is used to further improve pressure proof strength and heat-resistant form retention.

Phenol resins are used so as to improve pressure proof strength and heat-resistant form retention. By adding wood powder and cloth into phenol resins, the material cost gets low advantageously.

Polyester resins are used so as to improve pressure proof strength and heat-resistant form retention. When the resins are used as a raw material in the form of sheet, glass fiber in the form of long fiber can be contained therein, to further improve pressure proof strength and heat-resistant form retention.

The thermosetting resin as the principal component may optionally be blended or copolymerized with an elastomer or gum.

The elastomer or gum is used in such blending or copolymerization, so as to further improve impact resistance.

The elastomer to be used for the blending or the copolymerization may include polyolefin elastomer, polyester elastomer and the like, and more specifically, preference is given to polyolefin elastomer from the respect of pressure proof strength.

The gum to be used for the blending or the copolymerization may include butadiene gum, ethylene propylene gum, acrylate gum, nitrile butadiene gum and the like, and more specifically, preference is given to nitrile butadiene gum from the respect of pressure proof strength.

The ratio for such blending or copolymerization of either of elastomer or gum should be 5 to 30 parts, more preferably 10 to 25 parts to 100 parts (parts by weight) of a thermosetting resin, from the respect of heat resistance and pressure proof strength.

Then, the thermoplastic resin will now be explained below.

From the respect of the environment and conditions where switches are used, the thermoplastic resin is preferably a material with oil resistance, but without specific limitation. Specifically, preference is given to polyacetal, polyethylene terephthalate, polybutylene terephthalate, polyamide, polyphenyl sulfide and the polymer alloy material thereof from the respect of heat resistance and pressure proof strength.

Among the thermoplastic resin, polyacetal and polyamide are-preferable because they do not have aromatic rings, in terms of the improvement of arc extinguishing potency.

The thermoplastic resin is used so as to improve pressure proof strength and arc extinguishing potency and to design the shortening of molding time because the resin is applicable when parts should be thinned or should be prepared into complex forms.

A molded articles composed of various organic and inorganic complex compositions according to the aforementioned Examples 8 to 14 was applied to boxes, cross bars, handles and trip bars as the components of a switch. The examples thereof are described hereinbelow.

EXAMPLE 15

Figure 2:
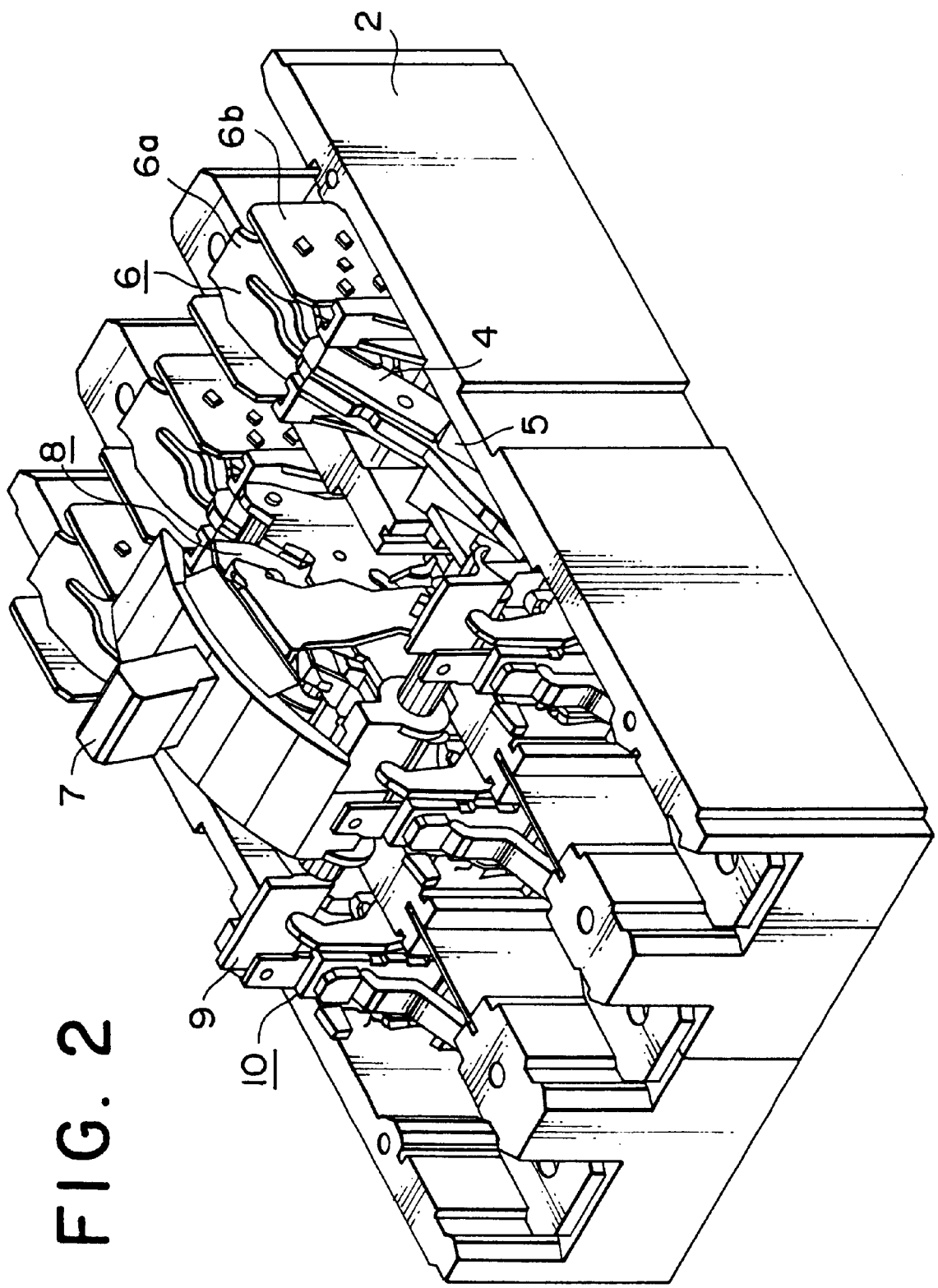
FIG. 2 is a schematic perspective view depicting the state without cover.
Figure 3:
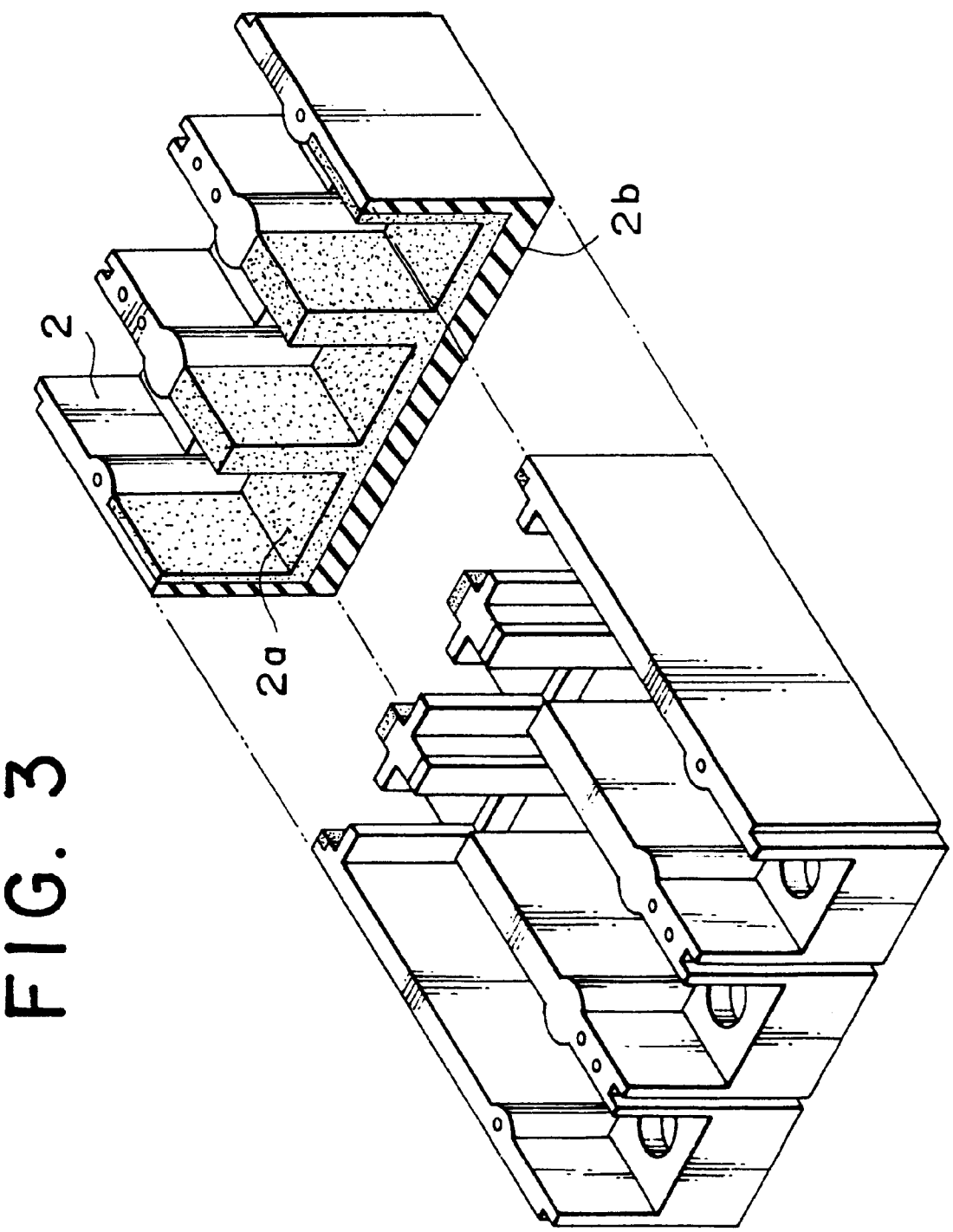
FIG. 3 is a schematic perspective view depicting the base of a box formed by compact double molding, wherein a part of the box is cut.

FIG. 1 is a schematic perspective view depicting the appearance of a circuit breaker; and FIG. 2 is a schematic perspective view depicting the state without cover. In the figures, 1 represents box composed of base 2 and cover 3. 4 represents mobile contacts individually contacting with and separating from fixed joints (not shown) of individual electrodes, and any of them is supported concurrently with cross bar 5. 6 represents a device for extinguishing arc, which is mounted in front of mobile contacts 4 and is composed of arc extinguishing board 6a and arc extinguishing side board 6b. 7 represents handle protruding outward from box 1, and opens and closes the mobile contacts 4 through opening and closing part 8. 9 represents trip bar constituting tripping device 10. FIG. 3 is a schematic perspective view depicting the state wherein a part of the base formed by compact double molding is cut. In the figure, base 2 has base inside 2a composed of the inorganic and organic complex composition of the present invention and base outside 2b composed of a structural composition, wherein a part holding opening and closing part 8, both contacts, arc extinguishing device 6 and trip bar 9 is doubly molded.

According to this example, arc is generated between the contacts of the electrodes when the electrodes of the switch are opened and closed, and free carbon generating from the organic material constituting the inside and metallic steam and melt metal liquid droplets generating from the metallic parts constituting the inside are modified into insulated bodies by gas to provide insulation, the gas being generated from the inorganic compounds being contained in the organic and inorganic complex composition constituting the base inside 2a and being capable of dehydration at 150° C. or more, whereby the decrease of electric resistance of the base inside is prevented to improve the insulation potency of the electrodes after opening and closing of the electrodes of the switch. Also, the damage of the base of the box due to high-pressure steam generated via the arc is simultaneously prevented by the structural composition forming the base outside 2b, advantageously.

EXAMPLE 16

Figure 4:
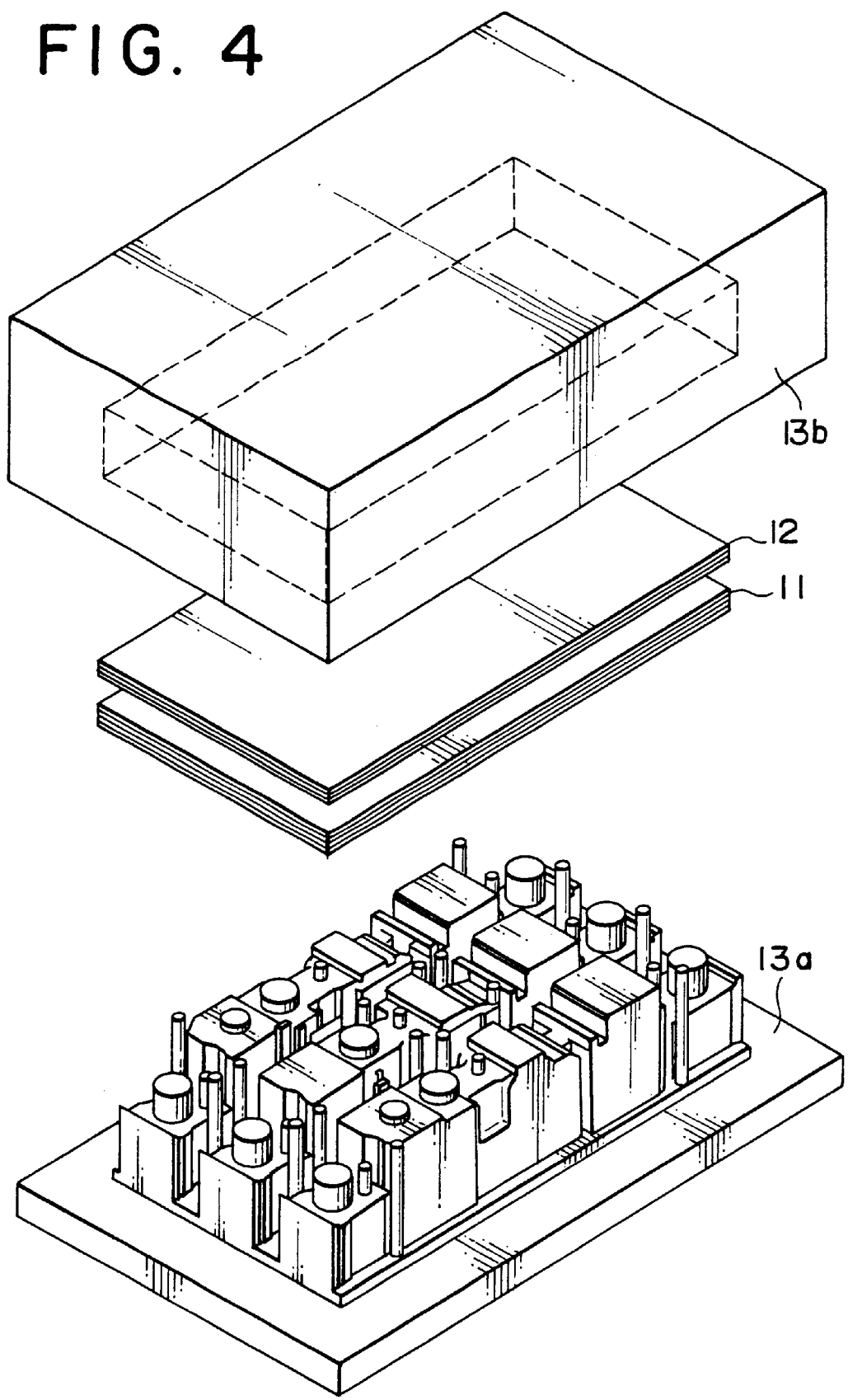
FIG. 4 is a schematic explanatory view depicting a compact double molding method of the base of a box using the organic and inorganic complex composition in the form of sheet.

FIG. 4 is a schematic explanatory view depicting a compact double molding method of the base of a box by means of the organic and inorganic complex composition in the form of sheet in accordance with the present invention. In the figure, 11 represents the organic and inorganic complex composition in the form of sheet; 12 represents a structural composition in the form of sheet; 13a represents bottom mold; and 13b represents upper mold. Firstly, the organic and inorganic complex composition in the form of sheet 11 is placed on the bottom mold 13a, and the structural composition in the form of sheet 12 is mounted thereon to completely cover the organic and inorganic complex composition in the form of sheet 11. The production method can readily produce base 2 of the box composed of the inner base 2a comprising the organic and inorganic complex composition of the present invention and the outward base 2b comprising the structural composition. Also, the cover may be produced by the same method.

EXAMPLE 17

Figure 5:
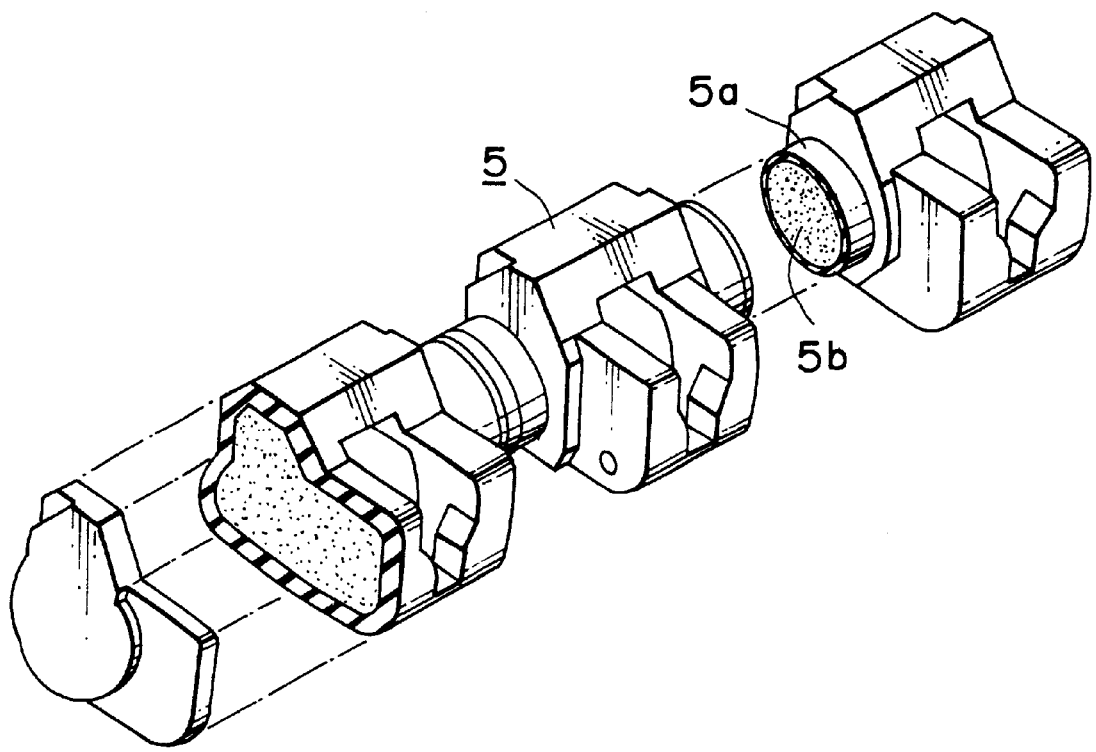
FIG. 5 is a schematic perspective view depicting a cross bar formed by transfer molding, wherein a part of the bar is cut.

FIG. 5 is a schematic perspective view depicting the state wherein a part of a cross bar formed by transfer molding is cut. In the figure, cross bar 5 has surface layer part 5a formed from the organic and inorganic complex composition of the present invention and inner layer part 5b formed from a structural composition.

According to the Example, free carbon, metallic steam and melt metal liquid droplets, which are all generated by arc generation between the contacts of electrodes during opening and closing of the electrodes of a switch, are modified into insulated bodies with gas to provide insulation which gas is generated from the inorganic compounds being contained in the organic and inorganic complex composition forming the cross bar surface layer part 5a and being capable of dehydration at 150 or more, whereby the decrease of electric resistance is prevented on the surface of the cross bar over the switch phase, which is advantageous for the improvement of the insulation over the switch phase. Simultaneously, it is advantageous that the damage of the cross bar via high-pressure steam generated with the arc is prevented with the structural composition forming the cross bar inner layer part 5b.

EXAMPLE 18

Figure 6:
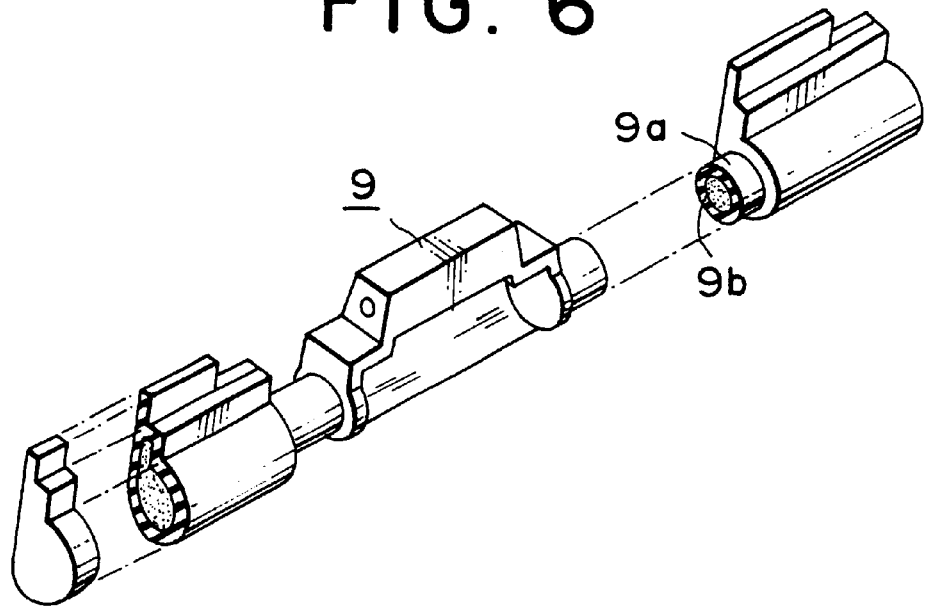
FIG. 6 is a schematic perspective view depicting a trip bar formed by transfer molding, wherein a part of the bar is cut.

FIG. 6 is a schematic perspective view depicting the state wherein a part of a trip bar formed by transfer molding is cut. In the figure, trip bar 9 has surface layer part 9a formed from the organic and inorganic complex composition of the present invention and inner layer part 9b formed from a structural composition.

According to the Example, free carbon, metallic steam and melt metal liquid droplets, which are all generated by arc generation between the contacts of electrodes during opening and closing of the electrodes of a switch, are modified into insulated bodies with gas to provide insulation which gas is generated from the inorganic compounds being contained in the organic and inorganic complex composition forming the trip bar surface layer part 9a and being capable of dehydration at 150 or more, whereby the decrease of electric resistance is prevented on the surface of the trip bar over the switch phase, which is advantageous for the improvement of the insulation over the switch phase. Simultaneously, it is advantageous that the damage of the trip bar via high-pressure steam generated with the arc is prevented with the structural composition forming the trip bar inner layer part 9b.

EXAMPLE 19

Figure 7:
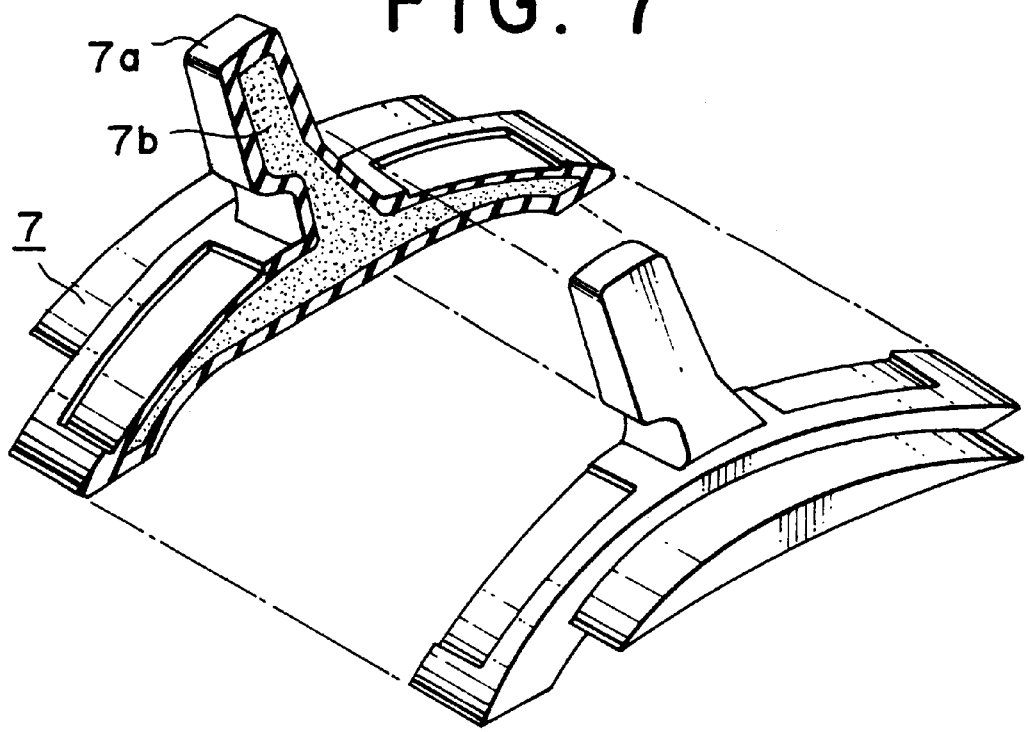
FIG. 7 is a schematic perspective view depicting a handle formed by transfer molding, wherein a part of the handle is cut.

FIG. 7 is a schematic perspective view depicting the state wherein a part of a handle formed by transfer molding is cut. In the figure, handle 7 has surface layer part 7a formed from the organic and inorganic complex composition of the present invention and inner layer part 7b formed from a structural composition.

According to the Example, free carbon, metallic steam and melt metal liquid droplets, which are all generated by arc generation between the contacts of electrodes during opening and closing of the electrodes of a switch, are modified into insulated bodies with gas to provide insulation which gas is generated from the inorganic compounds being contained in the organic and inorganic complex composition forming the handle bar surface layer part 7a and being capable of dehydration at 150 or more, whereby the decrease of electric resistance is prevented on the surface of the handle 7, which is advantageous for the improvement of the insulation of the switch. Simultaneously, it is advantageous that the damage of the handle via high-pressure steam generated with the arc is prevented with the structural composition forming the handle inner layer part 7b.

EXAMPLE 20

Figure 8:
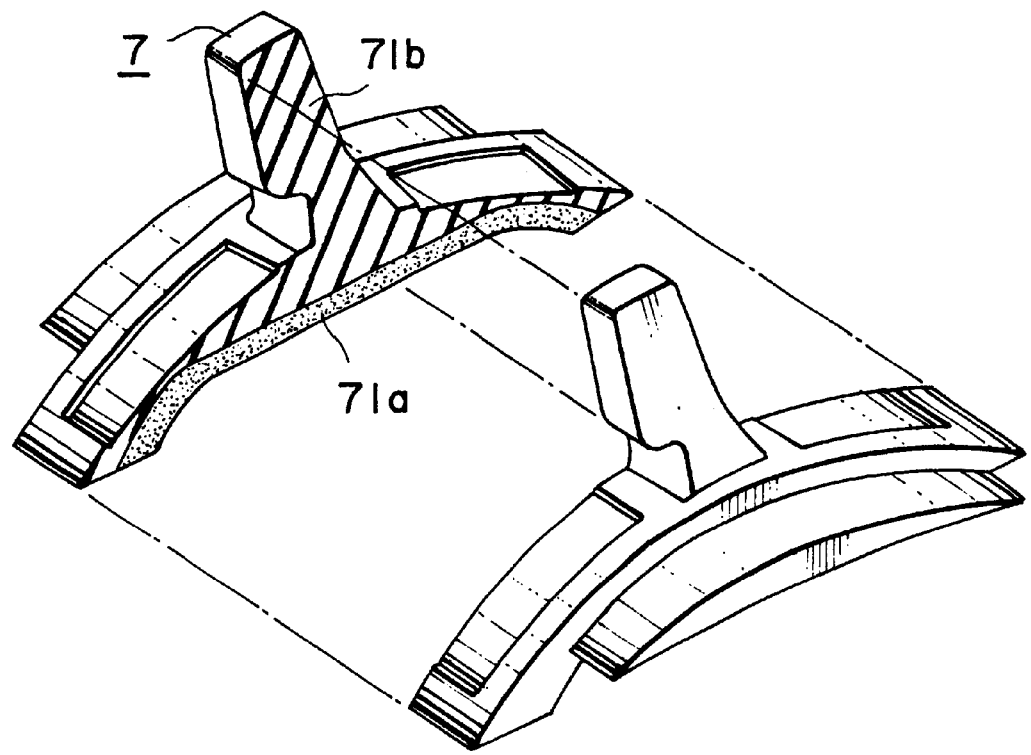
FIG. 8 is a schematic perspective view depicting a handle formed by injection 2-color molding, wherein a part of the handle is cut.

FIG. 8 is a schematic perspective view depicting the state wherein a part of a handle formed by injection two-color molding is cut. In the figure, handle 7 has inside part 71a formed from the organic and inorganic complex composition of the present invention and outside part 7b formed from a structural composition. Deposition of free carbon, metallic steam and melt metal liquid droplets occurs principally to the inside of a switch to decrease electric resistance, which are all generated by arc generation between the contacts of electrodes during opening and closing of the electrodes of the switch. By forming those, except handle 71a facing the inside of the switch, with the structural composition, the strength of repeated opening and closing of handles is advantageously improved.

EXAMPLE 21

Figure 9:
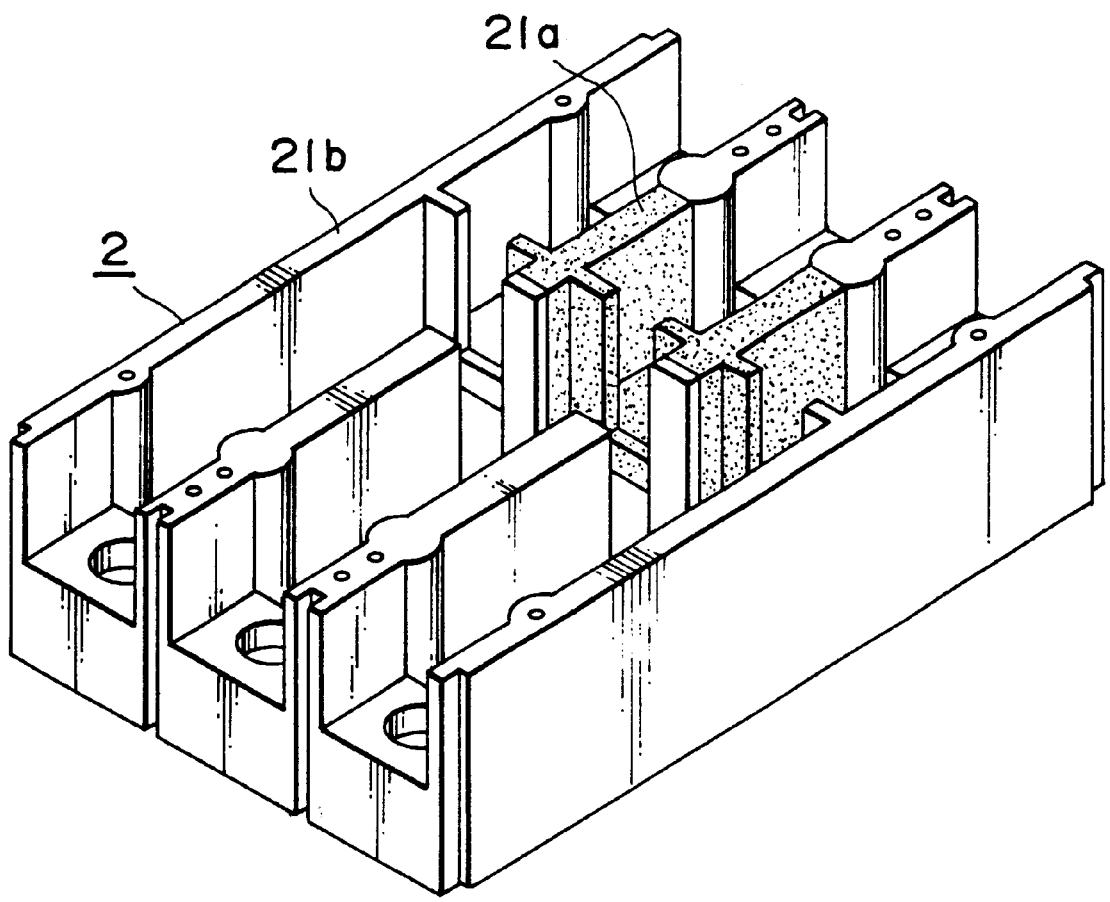
FIG. 9 is a schematic perspective view depicting the base of a box in accordance with the present invention.

FIG. 9 is a schematic perspective view of a base. In the figure, the peripheral part 21a of the contacts of base 2 of the box of a switch, ie. central electrode part, is formed from the organic and inorganic complex composition of the present invention, while other parts 21b of the base are formed from a structural composition.

According to the Example, in the case of a switch with three electrodes, not only the decrease of electric resistance due to the deposition of free carbon, metallic steam and melt metal liquid droplets generated by arc generation between the contacts of the individual electrodes was markedly low; but also the decrease of electric resistance on the sides of electric power supply/load of the central electrode was distinctively poor compared with both of the left and right electrodes because the switch system part composed of a metal material of electric continuity was positioned at the central electrode. By forming the peripheral part 21a of the contacts of the base, ie. central electrode part, with the organic and inorganic complex composition of the present invention, the insulation resistance on the sides of electric power supply/load on the central electrode is advantageously improved. Simultaneously, it is advantageous that the damage of the box via high-pressure steam generated with the arc is prevented with the structural composition forming the other parts 21b of the box. Furthermore, such effect is not limited to switches with three electrodes, but the effect is brought about for switches with two or four electrodes.

Molded articles composed of the organic and inorganic complex composition of the present invention may be any one of thermoplastic resins and thermosetting resins. By subjecting a molded article of a preliminarily molded peripheral part of contacts to injection two-color molding, the base of a box can readily been produced. Otherwise, by compact double molding using a material composed of the organic and inorganic complex composition or a molded article composed of the organic and inorganic complex composition, the base of a box can readily been produced.

EXAMPLE 22

Figure 10:
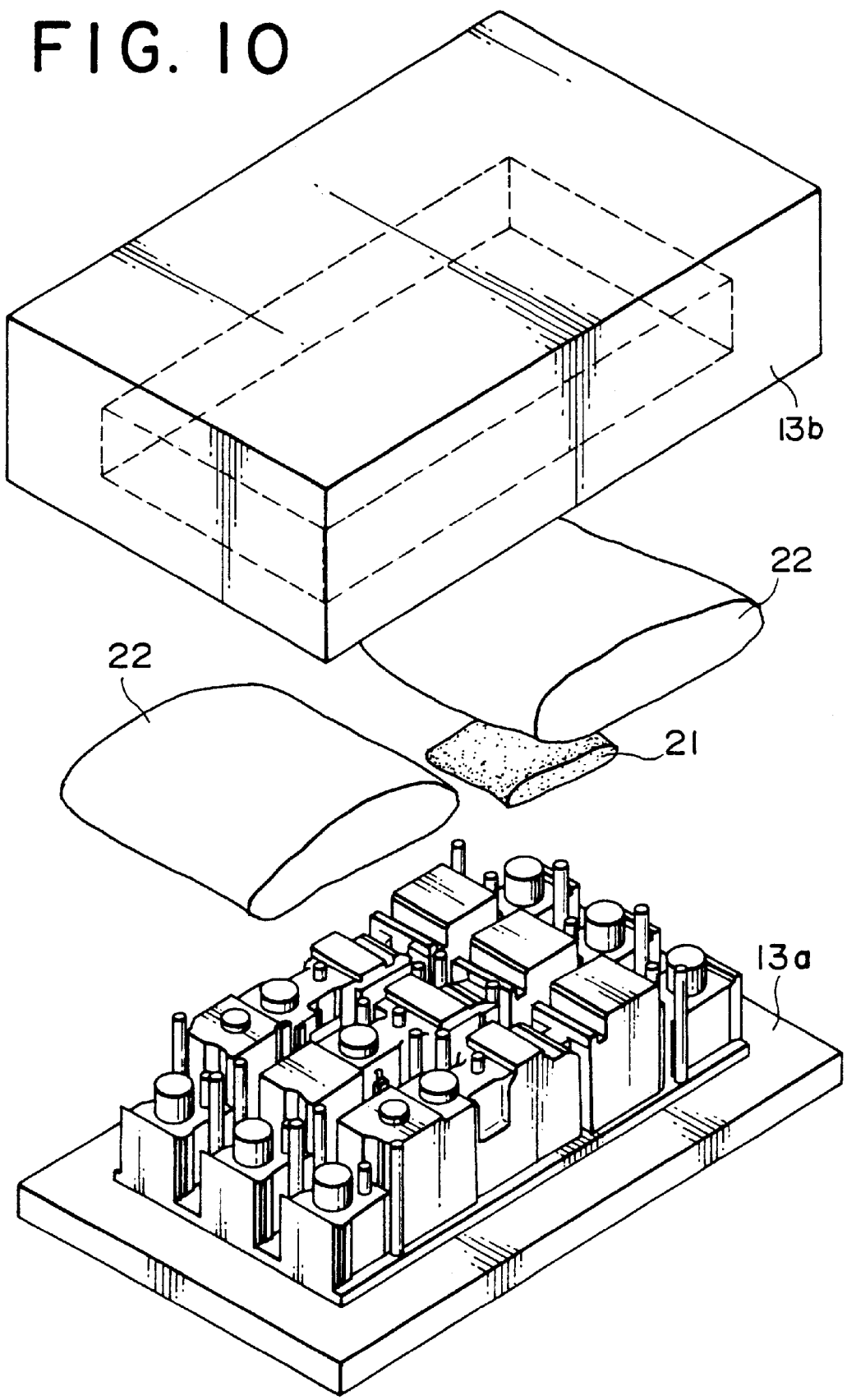
FIG. 10 is a schematic explanatory view depicting a compact double molding method of the base of a box.

FIG. 10 is a schematic explanatory view depicting a compact double molding method, comprising placing a molded article composed of the organic and inorganic complex composition constituting the peripheral part of the contacts or a material 21 composed of the organic and inorganic complex composition, at a position corresponding to the peripheral part of the contacts in a mold for compact molding, and placing structural composition 22 of a thermosetting resin at other parts for molding. By the method, the base of a box can readily been produced.

EXAMPLE 23

Figure 11:
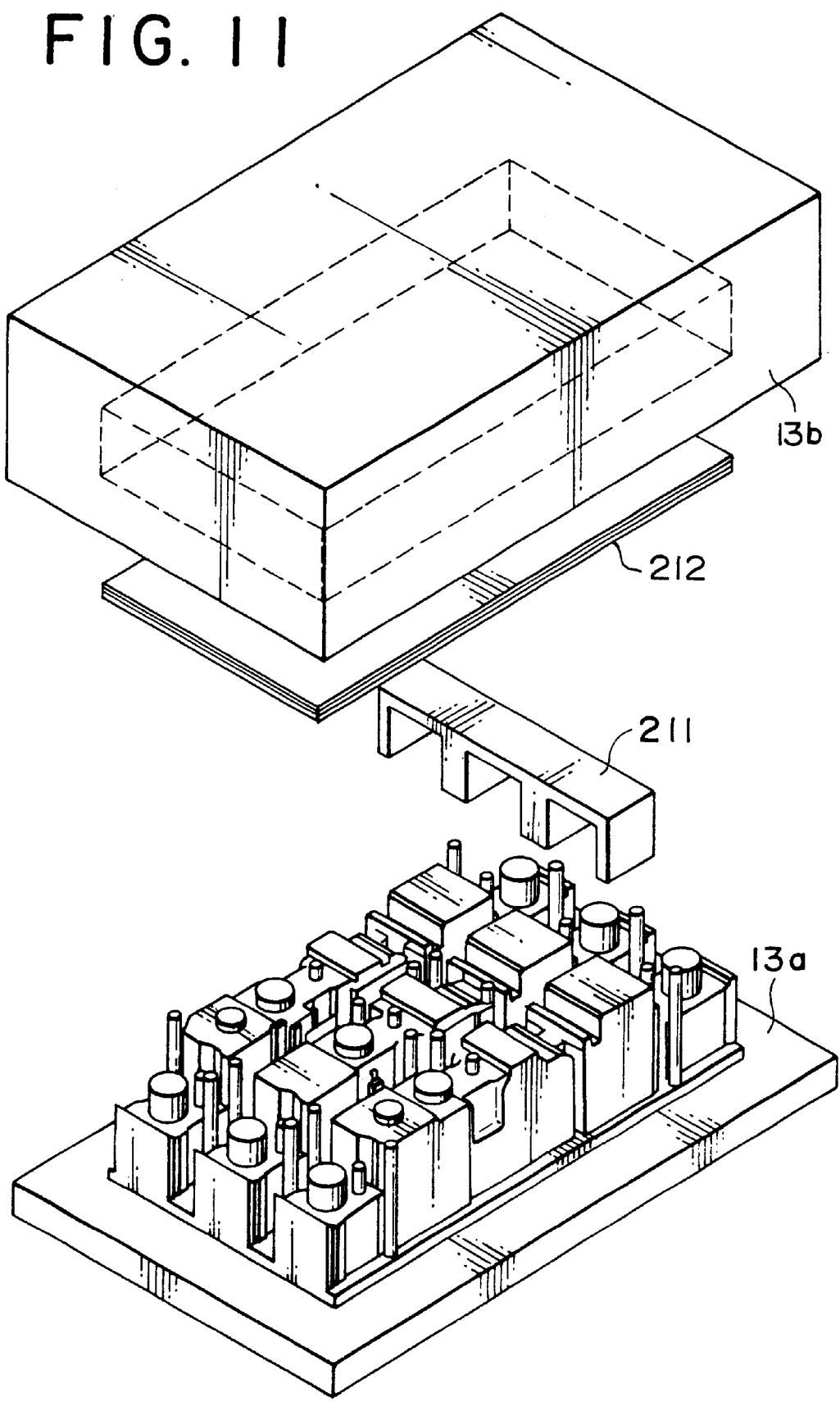
FIG. 11 is a schematic explanatory view depicting a compact double molding method of the base of a box.

FIG. 11 is a schematic explanatory view depicting a compact double molding method, comprising placing a molded article or a material 211 composed of the organic and inorganic complex composition constituting the peripheral part of the contacts, at a position corresponding to the peripheral part of the contacts in a mold for compact molding, and covering the molded article or material 211 composed of the organic and inorganic complex composition constituting the peripheral part of the contacts with a sheet material 212 composed of a thermosetting resin for molding. By the method, the base of a box can readily been produced. Simultaneously, the organic and inorganic complex composition placed at the part corresponding to the peripheral part of the contacts in the mold, in accordance with the present invention, does not appear outside of the base of the box, but the outside of the base is covered with the sheet material 212 composed of a thermosetting resin, and therefore, it is advantageous that the damage of the box with high-pressure steam generated with arc can be prevented.

EXAMPLE 24

Figure 12:
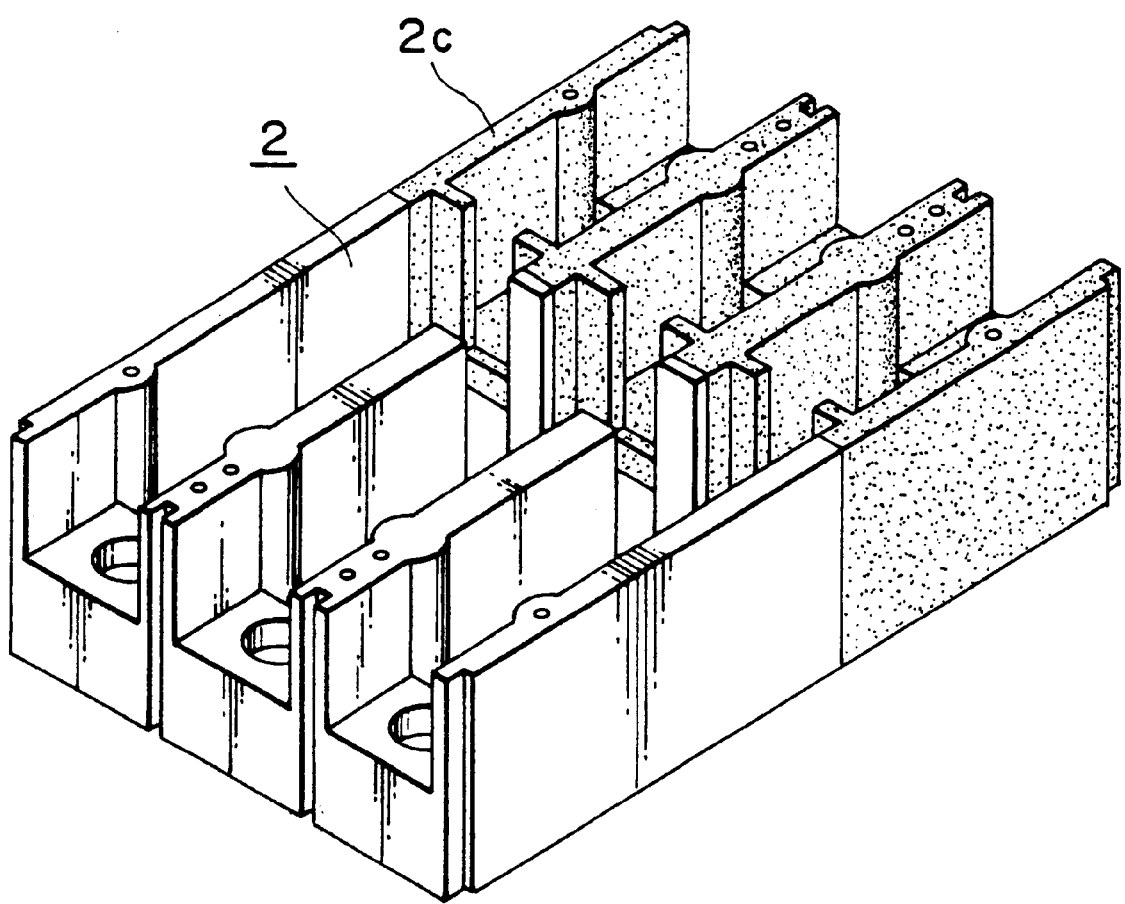
FIG. 12 is a schematic perspective view depicting the base of a box.

FIG. 12 is a schematic perspective view depicting base. In the figure, the electric power supply side 2c in the base 2 of the box is formed of the organic and inorganic complex composition of the present invention.

According to the Example, the electric supply side 2c of the base is formed of the organic and inorganic complex composition of the present invention, whereby the decrease of electric resistance due to the deposition of free carbon, metallic steam and melt metal liquid droplets is advantageously prevented. Simultaneously, an economical advantage is also brought about by forming the load side of the switch with an economical structural composition of the material unit price being low.

EXAMPLE 25

Explanation will now follow about a method for producing the electric power supply side of the base of a box with the organic and inorganic complex composition of the present invention.

The organic and inorganic complex composition of the present invention may be any one of a thermoplastic resin and a thermosetting resin. By subjecting a molded article of a preliminarily molded electric power supply side of the base to injection two-color molding, the base of a box can readily been produced. By placing a molded article composed of the organic and inorganic complex composition on the side of electric power supply in a mold for compact molding, and placing a material of a thermosetting resin on the load side in the mold for compact molding, the base of a box can readily been produced. Also, by placing a material composed of the organic and inorganic complex composition of a thermosetting resin in accordance with the present invention on the side of electric power supply in a mold for compact molding, and placing a material of a thermosetting resin on the load side in the mold for compact molding, the base of a box can readily been produced. In terms of productivity, the above method is preferable.

The following shut-off test and meg measuring test were carried out on switches having at least one of a box, a cross bar, a handle and a trip bar, of which the entirety or a part is composed of various organic and inorganic complex compositions.

Shut-off Test

At a closing state, by passing excess electric current of 3-phase 460 V/30 KA, a mobile contact is opened to generate arc current. If the shut off of the arc current is successful, or if no damage or crack is observed in the inner parts of circuit breakers or boxes after shut-off, the test can be passed.

Meg Measuring Test

The test is carried out as follows.

After the shut-off test, the insulation resistance is measured with an insulation resistor described in JIS C1302. The results are shown as the minimum insulation resistance. When a sample was a box, the insulation resistance between the contacts or between the electric supply loads was measured. When a sample was a handle, the insulation resistance between the gap of the cover and the handle and the main circuit was measured. When a sample was a trip bar or a cross bar, the insulation resistance of the surface layer between the terminals of the part was measured.

Using a sample piece composed of the generated organic and inorganic complex composition, the following combustion test was carried out.

Combustion Test

Vertical combustion test and horizontal combustion test described in UL94. Based on the vertical test, the results are shown in values corresponding to V-0, V-1, and V-2. Based on the results of the horizontal test, the results are shown in values corresponding to HB.

Firstly, samples 1 to 14 are explained. A trip bar shown in FIG. 6 was prepared from organic and inorganic complex compositions described in Tables 1 and 2. The resin was acid anhydrous epoxy resin. As the inorganic compound capable of dehydration at 150° C. or more, aluminium hydroxide was used. As the reinforcing material, glass fiber and calcium carbonate were used. As a comparative example, a trip bar of a composition with the content of a resin polybutylene terephthalate at 70 wt % and the content of a reinforcing material glass fiber at 30 wt %.

TABLE 1

| Composition of the Inside of trip bar | Resin ratio by weight (wt %) | (A) Ratio by weigh of inorganic compound capable of dehydration at 150° C. or more (wt %) | (B) Reinforcing material | | |
|---|---|---|---|---|---|
| | | | Glass fiber ratio by weight (wt %) | Ceramic fiber ratio by weight (wt %) | Inorganic mineral ratio by weight (wt %) |
| Comparative example | 70 Polybulylene terephthalate | 0.00 | 30.0 | 0.0 | 0.0 |
| Limited range of composition | 15–65 | 80–30 | | 5–55 | |
| Sample 1 | 15 Epoxy | 80 Aluminium hydroxide | 5 | 0.0 | 0.0 |
| Sample 2 | 15 Epoxy | 30 Aluminium hydroxide | 55 | 0.0 | 0.0 |

TABLE 1-continued

| Sample 3 | 65 Epoxy | 30 Aluminium hydroxide | 5 | 0.0 | 0.0 |
|---|---|---|---|---|---|

| | Composition of the Inside of trip bar | Results of short-circuit test | | Combustibility test |
|---|---|---|---|---|
| | | Part appearance | Meg measured values (MΩ) | |
| | Comparative example | Crack of damage None | 0.1 | HB |
| | Limited range of composition | — | — | — |
| | Sample 1 | Crack of damage None | 50 | Corresponding to V-0 |
| | Sample 2 | Crack of damage None | 20 | Corresponding to HB |
| | Sample 3 | Crack of damage None | 7 | Corresponding to HB |

TABLE 2

| Composition of the inside of trip bar | Resin ratio by weight (wt %) | (A) Ratio of weigh of inorganic compound capable of dehydration at 150° C. or more (wt %) | (B) Reinforcing material | | |
|---|---|---|---|---|---|
| | | | Glass fiber ratio by weight (wt %) | Ceramic fiber ratio by weight (wt %) | Inorganic mineral ratio by weight (wt %) |
| Comparative example | 25 Polyester | 0.00 | 15 | 0 | 60 Calcium carbonate |
| Limited range of composition | 15–65 | 80–30 | | 5–55 | |
| Sample 4 | 25 Epoxy resin | 67.50 Aluminium hydroxide | 7.5 | 0 | 0 |
| Sample 5 | 25 Epoxy resin | 65 Aluminium hydroxide | 10 | 0 | 0 |
| Sample 6 | 25 Epoxy resin | 60 Aluminium hydroxide | 15 | 0 | 0 |
| Sample 7 | 25 Epoxy resin | 55 Aluminium hydroxide | 15 | 0 | 5 Calcium carbonate |
| Sample 8 | 25 Epoxy resin | 50 Aluminium hydroxide | 15 | 0 | 10 Calcium carbonate |
| Sample 9 | 25 Epoxy resin | 45 Aluminium hydroxide | 15 | 0 | 15 Calcium carbonate |
| Sample 10 | 25 Epoxy resin | 40 Aluminium hydroxide | 15 | 0 | 20 Calcium carbonate |
| Sample 11 | 25 Epoxy resin | 55 Aluminium hydroxide | 20 | 0 | 0 |
| Sample 12 | 25 Epoxy resin | 50 Aluminium hydroxide | 20 | 0 | 5 Calcium carbonate |
| Sample 13 | 25 Epoxy resin | 45 Aluminium hydroxide | 20 | 0 | 10 Calcium carbonate |
| Sample 14 | 25 Epoxy resin | 40 Aluminium hydroxide | 20 | 0 | 15 Calcium carbonate |

| Composition of the inside of trip bar | Results of short-circuit test | | Combustibility test |
|---|---|---|---|
| | Part appearance | Meg measured values (MΩ) | |
| Comparative example | Crack of damage None | 0.3 | |
| Limited range of composition | — | 13 | — |
| Sample 4 | Crack of damage None | 18 | Corresponding to V-0 |
| Sample 5 | Crack of damage None | 20 | Corresponding to V-0 |
| Sample 6 | Crack of damage None | 10 | Corresponding to V-0 |
| Sample 7 | Crack of damage None | 12 | Corresponding to V-0 |
| Sample 8 | Crack of damage None | 8 | Corresponding to V-0 |
| Sample 9 | Crack of damage None | 7 | Corresponding to V-0 |
| Sample 10 | Crack of damage | 5 | Corresponding |

TABLE 2-continued

|  | one |  | to V-1 |
|---|---|---|---|
| Sample 11 | Crack of damage None | 3 | Corresponding to V-0 |
| Sample 12 | Crack of damage None | 5 | Corresponding to V-0 |
| Sample 13 | Crack of damage None | 2 | Corresponding to V-0 |
| Sample 14 | Crack of damage None | 2.5 | Corresponding to V-1 |

The method for preparing a sample will now be explained below. Firstly, the principal agent of epoxy resin, a curing agent, aluminium hydroxide, calcium carbonate, glass fiber, and black carbon were preliminarily heated in a thermostat at 120° C. for about 2 hours. Then, taking out the principal agent of epoxy resin, aluminium hydroxide, calcium carbonate, and glass fiber from the thermostat, sufficient agitation of aluminium hydroxide, calcium carbonate and glass fiber was done to homogeneity, and the resulting mixture was again heated in the thermostat at 120° C. for 30 minutes. Subsequently, the mixture and the curing agent of the epoxy resin were taken out from the thermostat, followed by adding a curing agent of epoxy resin to the mixture for sufficient agitation. Thereafter, black carbon was added for sufficient agitation. The thus generated organic and inorganic complex composition was subjected to defoaming in vacuum. Then, the organic and inorganic complex composition was poured into a trip bar mold preliminarily heated in a thermostat at 120° C., for defoaming in vacuum. Then, curing was effected in the thermostat at 120° C. for 24 hours. Drawing the molded article of trip bar from the mold, the article was further heated in the thermostat at 120° C. for 24 hours.

Mounting the thus obtained trip bar onto a circuit breaker, the aforementioned shut-off test was carried out. After the shut-off test, the apparent state of the trip bar was visually observed while the meg between individual terminals was measured.

Consequently, as is apparently shown above in Tables 1 and 2, the trip bars composed of the organic and inorganic complex compositions generated in the Examples 1 to 14 of the present invention had scarce damage under visual observation after the shut-off test, and their meg values were 0.5 MΩ or more, excellently.

The samples 15 to 31 are explained hereinbelow. Handles shown in FIG. 7 were prepared from the organic and inorganic complex compositions described in Tables 3 and 4. The resin was melamine resin. The inorganic compound capable of dehydration at 150° C. or more was aluminium hydroxide. The reinforcing material was glass fiber and calcium carbonate. As a comparative example, use was made of a handle of a composition with the polybutylene terephthalate content of 70 wt % and the content of the reinforcing material glass fiber of 30 wt %.

TABLE 3

| Composition of the inside of handle | Resin ratio by weight (wt %) | Ⓐ Ratio by weigh of inorganic compound capable of dehydration at 150° C. or more (wt %) | Ⓑ Reinforcing material | | |
|---|---|---|---|---|---|
| | | | Glass fiber ratio by weight (wt %) | Ceramic fiber ratio by weight (wt %) | Inorganic mineral ratio by weight (wt %) |
| Comparative example | 70 Polybutylene terephthalate | 0.00 | 30.0 | 0.0 | 0.0 |
| Limited range of composition | 30–65 | 65–30 | 5–40 | | |
| Sample 15 | 30 Melamine resin | 30 Aluminium hydroxide | 40 | 0.0 | 0.0 |
| Sample 16 | 30 Melamine resin | 65 Aluminium hydroxide | 5 | 0.0 | 0.0 |
| Sample 17 | 65 Melamine resin | 30 Aluminium hydroxide | 5 | 0.0 | 0.0 |
| Sample 18 | 40 Melamine resin | 35 Aluminium hydroxide | 25 | 0.0 | 0.0 |
| Sample 19 | 50 Melamine resin | 35 Aluminium hydroxide | 15 | 0.0 | 0.0 |
| Sample 20 | 60 Melamine resin | 35 Aluminium hydroxide | 5 | 0.0 | 0.0 |

TABLE 3-continued

| | Composition of the inside of handle | Results of short-circuit test | | |
|---|---|---|---|---|
| | | Part appearance | Meg measured values (MΩ) | Combustibility test |
| | Comparative example | Crack of damage None | 0.2 | HB |
| | Limited range of composition | — | — | — |
| | Sample 15 | Crack of damage None | 0.9 | Corresponding to HB |
| | Sample 16 | Crack of damage None | 2.5 | Corresponding to V-0 |
| | Sample 17 | Crack of damage None | 0.6 | Corresponding to HB |
| | Sample 18 | Crack of damage None | 1.5 | Corresponding to HB |
| | Sample 19 | Crack of damage None | 1 | Corresponding to HB |
| | Sample 20 | Crack of damage None | 2 | Corresponding to HB |

TABLE 4

| Composition of inside of handle | Resin ratio by weight (wt %) | (A) Ratio by weigh of inorganic compound capable of dehydration at 150° C. or more (wt %) | (B) Reinforcing material | | |
|---|---|---|---|---|---|
| | | | Glass fiber ratio by weight (wt %) | Ceramic fiber ratio by weight (wt %) | Inorganic mineral ratio by weight (wt %) |
| Comparative example | 70 Polybutylene terephthalate | 0.00 | 30.0 | 0.0 | 0.0 |
| Limited range of composition | 30–65 | 65–30 | | 5–40 | |
| Sample 21 | 40 Melamine | 55 Aluminium hydroxide | 5 | 0 | 0 |
| Sample 22 | 40 Melamine resin | 50 Aluminium hydroxide | 10 | 0 | 0 |
| Sample 23 | 40 Melamine resin | 50 Aluminium hydroxide | 5 | 0 | 5 Calcium carbonate |
| Sample 24 | 40 Melamine resin | 45 Aluminium hydroxide | 15 | 0 | 0 |
| Sample 25 | 40 Melamine resin | 40 Aluminium hydroxide | 20 | 0 | 0 |
| Sample 26 | 40 Melamine resin | 40 Aluminium hydroxide | 10 | 0 | 10 Calcium carbonate |
| Sample 27 | 45 Melamine resin | 45 Aluminium hydroxide | 10 | 0 | 0 |
| Sample 28 | 45 Melamine resin | 40 Aluminium hydroxide | 20 | 0 | 0 |
| Sample 29 | 50 Melamine resin | 40 Aluminium hydroxide | 10 | 0 | 0 |
| Sample 30 | 50 Melamine resin | 35 Aluminium hydroxide | 10 | 0 | 5 Calcium carbonate |
| Sample 31 | 50 Melamine resin | 35 Aluminium hydroxide | 5 | 0 | 10 Calcium carbonate |

| | Composition of inside of handle | Results of short-circuit test | | |
|---|---|---|---|---|
| | | Part appearance | Meg measured values (MΩ) | Combustibility test |
| | Comparative example | Crack of damage None | 0.2 | HB |

TABLE 4-continued

| | | | | |
|---|---|---|---|---|
| | Limited range of composition | — | — | — |
| | Sample 21 | Crack of damage None | 8 | Corresponding to V-0 |
| | Sample 22 | Crack of damage None | 8 | Corresponding to V-0 |
| | Sample 23 | Crack of damage None | 9 | Corresponding to V-0 |
| | Sample 24 | Crack of damage None | 6 | Corresponding to V-2 |
| | Sample 25 | Crack of damage None | 2 | Corresponding to V-2 |
| | Sample 26 | Crack of damage None | 5 | Corresponding to V-2 |
| | Sample 27 | Crack of damage None | 6 | Corresponding to V-2 |
| | Sample 28 | Crack of damage None | 2 | Corresponding to V-2 |
| | Sample 29 | Crack of damage None | 2.5 | Corresponding to V-2 |
| | Sample 30 | Crack of damage None | 3 | Corresponding to V-2 |
| | Sample 31 | Crack of damage None | 1.8 | Corresponding to V-2 |

The method for preparing a sample will now be explained below. Firstly, melamine resin in solid powder, an acid catalyst, carbon black, aluminium hydroxide, glass fiber and calcium carbonate were placed in a polyethylene bag, for sufficient kneading. Then, the kneaded product was further kneaded, for 5 minutes, with a roll kept at 100° C., followed by cooling at room temperature and grinding with a crude grinder for 5 minutes and with a fine grinder for another 5 minutes, to produce an organic and inorganic complex composition.

Handles were molded by injection molding. The thus obtained handles were mounted onto a circuit breaker, for carrying out the shut-off test. After the shut-off test, the apparent state of the handles was observed visually, and the meg measurement was done.

Consequently, as is apparently shown in Tables 3 and 4, the handles composed of the organic and inorganic complex compositions generated in the Examples 15 to 31 of the present invention had scarce damage under visual observation after the shut-off test, and their meg values were 0.5 MΩ or more, excellently. By using urea resin, melamine phenol resin, or diallylphthalate resin instead of melamine resin, the same excellent results were obtained.

Explanation will follow about samples 32 to 43. Bases of a box shown in FIG. 12 were prepared with the organic and inorganic complex compositions described below in Tables 5 to 6. The resin was novolak phenol resin. The inorganic compound capable of dehydration at 150° C. or more was aluminium hydroxide. As the reinforcing material, glass fiber and calcium carbonate were used. As a comparative example, the base of a box, composed of the composition with the content of a resin polyester at 25 wt % and the contents of the reinforcing materials glass fiber and calcium carbonate at 15 wt % and 60 wt %, respectively.

TABLE 5

| Composition of inside of box | Resin ratio by weight (wt %) | Ⓐ Ratio of weigh of inorganic compound capable of dehydration at 150° C. or more (wt %) | Ⓑ Reinforcing material | | |
|---|---|---|---|---|---|
| | | | Glass fiber ratio by weight (wt %) | Ceramic fiber ratio by weight (wt %) | Inorganic mineral ratio by weight (wt %) |
| Comparative example | 25 Polyester | 0 | 15 | 0 | 60 Calcium carbonate |
| Limited range of composition | 25–60 | 70–35 | | 5–40 | |
| Sample 32 | 25 Phenol resin | 35 Aluminium hydroxide | 40 | 0 | 0 |
| Sample 33 | 25 Phenol resin | 70 Aluminium hydroxide | 5 | 0 | 0 |
| Sample 34 | 60 Phenol resin | 35 Aluminium hydroxide | 5 | 0 | 0 |
| Sample 35 | 50 Phenol resin | 40 Aluminium hydroxide | 10 | 0 | 0 |
| Sample 36 | 40 Phenol resin | 50 Aluminium hydroxide | 10 | 0 | 0 |
| Sample 37 | 35 Phenol resin | 55 Aluminium hydroxide | 10 | 0 | 0 |

TABLE 5-continued

| | Composition of inside of box | Results of short-circuit test | | Combustibility test |
|---|---|---|---|---|
| | | Part appearance | Meg measured values (MΩ) | |
| | Comparative example | Crack of damage None | 0.15 | HB |
| | Limited range of composition | — | — | — |
| | Sample 32 | Crack of damage None | 0.5 | Corresponding to V-2 |
| | Sample 33 | Crack of damage None | 7 | Corresponding to V-0 |
| | Sample 34 | Crack of damage None | 1 | Corresponding HB |
| | Sample 35 | Crack of damage None | 1.2 | Corresponding to HB |
| | Sample 36 | Crack of damage None | 3 | Corresponding to V-2 |
| | Sample 37 | Crack of damage None | 5.5 | Corresponding to V-2 |

TABLE 6

| Composition of the inside of box | Resin ratio by weight (wt %) | (A) Ratio by weigh of inorganic compound capable of dehydration at 150° C. or more (wt %) | (B) Reinforcing material | | |
|---|---|---|---|---|---|
| | | | Glass fiber ratio by weight (wt %) | Ceramic fiber ratio by weight (wt %) | Inorganic mineral ratio by weight (wt %) |
| Comparative example | 25 Polyester | 0 | 15 | 0 | 60 Calcium carbonate |
| Limited range of composition | 25–60 | 70–35 | | 5–40 | |
| Sample 38 | 40 Phenol resin | 55 Aluminium hydroxide | 5 | 0 | 0 |
| Sample 39 | 40 Phenol resin | 45 Aluminium hydroxide | 15 | 0 | 0 |
| Sample 40 | 40 Phenol resin | 45 Aluminium hydroxide | 10 | 0 | 5 Calcium carbonate |
| Sample 41 | 40 Phenol resin | 40 Aluminium hydroxide | 20 | 0 | 0 |
| Sample 42 | 40 Phenol resin | 40 Aluminium hydroxide | 15 | 0 | 5 Calcium carbonate |
| Sample 43 | 40 Phenol resin | 40 Aluminium hydroxide | 10 | 0 | 10 Calcium carbonate |

| | Composition of the inside of box | Results of short-circuit test | | Combustibility test |
|---|---|---|---|---|
| | | Part appearance | Meg measured values (MΩ) | |
| | Comparative example | Crack of damage None | 0.15 | HB |
| | Limited range of composition | — | — | — |
| | Sample 38 | Crack of damage None | 7.5 | Corresponding to V-2 |
| | Sample 39 | Crack of damage None | 3.5 | Corresponding to V-2 |
| | Sample 40 | Crack of damage None | 3.5 | Corresponding to V-2 |
| | Sample 41 | Crack of damage None | 4 | Corresponding to V-2 |
| | Sample 42 | Crack of damage None | 2 | Corresponding to V-2 |
| | Sample 43 | Crack of damage None | 4 | Corresponding to V-2 |

A method for preparing samples will now be explained below. Firstly, phenol, formalin, and an acid catalyst reacted together in a 100-liter reactor at a temperature of 80 to 100° C. for about 6 hours. After subsequent dehydration of the reactor for about 1 hour, liquid phenol rein was prepared. The liquid phenol resin was cooled in air, and solidified and ground. The ground phenol resin, hexamethylene tetramine, carbon black, aluminium hydroxide, glass fiber, and calcium carbonate were placed in a 100-liter ball mill kept to about 40° C., for 10-min mixing. Then, the resulting mixture was kneaded with a roll kept to 110° C. for 5 minutes, followed by grinding with a crude roller for 5 minutes and with a fine roller for another 5 minutes, to recover organic and inorganic complex compositions. Then, bases of a box shown in FIG. 12 were prepared.

Using the bases of a box thus prepared, the shut-off test was carried out. After the shut-off test, the apparent state of the bases of the box was visually observed, and the meg measurement between individual terminals was carried out.

Consequently, as is apparently shown in Tables 5 and 6, the bases of a box, composed of the organic and inorganic complex compositions from samples 32 to 73 of the present invention had scarce damage under visual observation after the shut-off test, and their meg values were 0.5 MΩ or more, excellently.

Explanation will follow about samples 44 to 73. Bases of a box shown in FIG. 12 were prepared with the organic and inorganic complex compositions described in Tables 7 to 9. The resin was polyester. The inorganic compound capable of dehydration at 150° C. or more was aluminium hydroxide. As the reinforcing material, glass fiber, calcium carbonate, talc and warastnite were used. As a comparative example, the base of a box, composed of the composition with the content of a resin polyester at 25 wt % and the contents of the reinforcing materials glass fiber and calcium carbonate at 15 wt % and 60 wt %, respectively.

TABLE 7

| Composition of the inside of box | Resin ratio by weight (wt %) | (A) Ratio by weigh of inorganic compound capable of dehydration at 150° C. or more (wt %) | (B) Reinforcing material | | |
|---|---|---|---|---|---|
| | | | Glass fiber ratio by weight (wt %) | Ceramic fiber ratio by weight (wt %) | Inorganic mineral ratio by weight (wt %) |
| Comparative example | 25 Polyester | 0 | 15 | 0 | 60 Calcium carbonate |
| Limited range of composition | 15–40 | 80–35 | | 5–50 | |
| Sample 44 | 15 Polyester | 35 Aluminium hydroxide | 50 | 0 | 0 |
| Sample 45 | 15 Polyester | 80 Aluminium hydroxide | 5 | 0 | 0 |
| Sample 46 | 40 Polyester | 35 Aluminium hydroxide | 25 | 0 | 0 |
| Sample 47 | 20 Polyester | 70 Aluminium hydroxide | 10 | 0 | 0 |
| Sample 48 | 20 Polyester | 65 Aluminium hydroxide | 15 | 0 | 0 |
| Sample 49 | 35 Polyester | 55 Aluminium hydroxide | 10 | 0 | 0 |
| Sample 50 | 35 Polyester | 50 Aluminium hydroxide | 15 | 0 | 0 |

| Composition of the inside of box | Results short-circuit test | | | |
|---|---|---|---|---|
| | Part appearance | Meg measured values (MΩ) | Combustibility test | |
| Comparative example | Crack of damage None | 0.15 | HB | |
| Limited range of composition | — | — | — | |
| Sample 44 | Crack of damage None | 2 | Corresponding to V-1 | |
| Sample 45 | Crack of damage None | 100 or more | Corresponding to V-0 | |
| Sample 46 | Crack of damage None | 3 | Corresponding to HB | |
| Sample 47 | Crack of damage None | 90 | Corresponding to V-0 | |
| Sample 48 | Crack of damage None | 40 | Corresponding to V-0 | |
| Sample 49 | Crack of damage None | 18 | Corresponding to V-1 | |
| Sample 50 | Crack of damage None | 11 | Corresponding to V-1 | |

TABLE 8

| Composition of the inside of box | Resin ratio by weight (wt %) | (A) Ratio by weigh of inorganic compound capable of dehydration at 150° C. or more (wt %) | (B) Reinforcing material | | |
|---|---|---|---|---|---|
| | | | Glass fiber ratio by weight (wt %) | Ceramic fiber ratio by weight (wt %) | Inorganic mineral ratio by weight (wt %) |
| Comparative example | 25 Polyester | 0 Calcium carbonate | 15 | 0 | 60 |

TABLE 8-continued

| | | | | | |
|---|---|---|---|---|---|
| Limited range of composition | 15–40 | 80–35 | | 5–50 | |
| Sample 51 | 25 Polyester | 65 Aluminium hydroxide | 10 | 0 | 0 |
| Sample 52 | 25 Polyester | 60 Aluminium hydroxide | 15 | 0 | 0 |
| Sample 53 | 25 Polyester | 55 Aluminium hydroxide | 20 | 0 | 0 |
| Sample 54 | 25 Polyester | 55 Aluminium hydroxide | 15 | 0 | 5 Calcium carbonate |
| Sample 55 | 25 Polyester | 55 Aluminium hydroxide | 10 | 0 | 10 Calcium carbonate |
| Sample 56 | 25 Polyester | 50 Aluminium hydroxide | 25 | 0 | 0 |
| Sample 57 | 25 Polyester | 50 Aluminium hydroxide | 15 | 0 | 10 Calcium carbonate |
| Sample 58 | 25 Polyester | 50 Aluminium hydroxide | 10 | 0 | 15 Calcium carbonate |
| Sample 59 | 25 Polyester | 45 Aluminium hydroxide | 30 | 0 | 0 |
| Sample 60 | 25 Polyester | 45 Aluminium hydroxide | 15 | 0 | 15 Calcium carbonate |

| Composition of the inside of box | Results of short-circuit test | | Combustibility test |
|---|---|---|---|
| | Part appearance | Meg measured values (MΩ) | |
| Comparative example | Crack of damage None | 0.15 | HB |
| Limited range of composition | — | — | — |
| Sample 51 | Crack of damage None | 50 | Corresponding to V-0 |
| Sample 52 | Crack of damage None | 50 | Corresponding to V-0 |
| Sample 53 | Crack of damage None | 35 | Corresponding to V-0 |
| Sample 54 | Crack of damage None | 30 | Corresponding to V-0 |
| Sample 55 | Crack of damage None | 20 | Corresponding to V-0 |
| Sample 56 | Crack of damage None | 18 | Corresponding to V-0 |
| Sample 57 | Crack of damage None | 12 | Corresponding to V-0 |
| Sample 58 | Crack of damage None | 25 | Corresponding to V-0 |
| Sample 59 | Crack of damage None | 7 | Corresponding 10 V-0 |
| Sample 60 | Crack of damage None | 10 | Corresponding to V-0 |

TABLE 9

| Composition of the inside of box | (A) Ratio by weigh of | | (B) Reinforcing material | | | | |
|---|---|---|---|---|---|---|---|
| | Resin ratio by weight (wt %) | inorganic compound capable of dehydration at 150° C. or more (wt %) | Glass fiber ratio by weight (wt %) | Ceramic fiber ratio by weight (wt %) | Inorganic mineral ratio by weight (wt %) | | |
| | | | | | Calcium carbonate | Talc | Warastnite |
| Comparative example | 25 Polyester | 0 | 15 | 0 | 60 | 0 | 0 |
| Limited range of composition | 15–40 | 80–35 | | | 5–55 | | |
| Sample 61 | 25 Polyester | 60 Aluminium hydroxide | 10 | 0 | 5 | 0 | 0 |
| Sample 62 | 25 Polyester | 60 Aluminium hydroxide | 10 | 0 | 0 | 5 | 0 |
| Sample 63 | 25 Polyester | 60 Aluminium hydroxide | 10 | 0 | 0 | 0 | 5 |
| Sample 64 | 25 Polyester | 55 Aluminium hydroxide | 10 | 0 | 0 | 10 | 0 |
| Sample 65 | 25 Polyester | 55 Aluminium hydroxide | 10 | 0 | 0 | 0 | 10 |

TABLE 9-continued

| Sample | | | | | | | |
|---|---|---|---|---|---|---|---|
| Sample 66 | 25 Polyester | 50 Aluminium hydroxide | 15 | 0 | 0 | 10 | 0 |
| Sample 67 | 25 Polyester | 50 Aluminium hydroxide | 15 | 0 | 0 | 0 | 10 |
| Sample 68 | 25 Polyester | 50 Aluminum hydroxide | 10 | 0 | 10 | 5 | 0 |
| Sample 69 | 25 Polyester | 50 Aluminium hydroxide | 10 | 0 | 10 | 0 | |
| Sample 70 | 25 Polyester | 50 Aluminium hydroxide | 10 | 0 | 0 | 15 | 0 |
| Sample 71 | 25 Polyester | 50 Aluminium hydroxide | 10 | 0 | 0 | 0 | is |
| Sample 72 | 25 Polyester | 50 Aluminium hydroxide | 10 | 0 | 10 | 5 | |
| Sample 73 | 25 Polyester | 50 Aluminium hydroxide | 10 | 0 | 0 | 5 | 10 |

| Composition of the inside of box | Results of short-circuit test | | |
|---|---|---|---|
| | Part appearance | Meg measured values (MΩ) | Combustibility test |
| Comparative example | Crack of damage None | 0.15 | HB |
| Limited range of composition | — | — | — |
| Sample 61 | Crack of damage None | 40 | Corresponding to V-0 |
| Sample 62 | Crack of damage None | 18 | Corresponding to V-0 |
| Sample 63 | Crack of damage None | 25 | Corresponding to V-0 |
| Sample 64 | Crack of damage None | 10 | Corresponding to V-0 |
| Sample 65 | Crack of damage None | 10 | Corresponding to V-0 |
| Sample 66 | Crack of damage None | 13 | Corresponding to V-0 |
| Sample 67 | Crack of damage None | 20 | Corresponding to V-0 |
| Sample 68 | Crack of damage None | 17 | Corresponding to V-0 |
| Sample 69 | Crack of damage None | 19 | Corresponding to V-0 |
| Sample 70 | Crack of damage None | 8 | Corresponding to V-0 |
| Sample 71 | Crack of damage None | 12 | Corresponding to V-0 |
| Sample 72 | Crack of damage None | 19 | Corresponding to V-0 |
| Sample 73 | Crack of damage None | 12 | Corresponding to V-0 |

A method for preparing samples will now be explained below. Firstly, unsaturated polyester, styrene beads, styrene monomer, an organic peroxide, a releasing agent, a thickener, carbon black, calcium carbonate or talc or warrastnite were placed in a kneader kept at 40° C., for 40-min kneading. Then, glass fiber was added to the resulting kneaded product, for further kneading for 5 minutes. Subsequently, the kneaded product was taken out from the kneader, and cooled at room temperature. Then, the cooled kneaded product was sealed in a polyethylene bag, and kept in a thermostat chamber at 20° C. for 72 hours, which was designated the organic and inorganic complex composition. Then, a base of a box shown in FIG. 12 was prepared by compact molding.

Using the base of a box thus obtained, the aforementioned shut-off test was carried out. After the shut-off test, the apparent state of the bases of the box was visually observed, and the meg measurement between individual terminals was carried out.

Consequently, as is apparently shown in Tables 7 and 9, the bases of a box, composed of the organic and inorganic complex compositions from samples 44 to 73 of the present invention had scarce damage under visual observation after the shut-off test, and their meg values were 0.5 MΩ or more, excellently.

Explanation will follow about samples 74 to 78. Handles shown in FIG. 8 were prepared with the organic and inorganic complex compositions described below in Table 10. The resin was polyacetal. The inorganic compound capable of dehydration at 200° C. or more was calcium aluminate. As the reinforcing material, glass fiber was used. As a comparative example, a handle composed of the composition with the content of a resin polybutylene terephthalate at 70 wt % and the content of the reinforcing material glass fiber at 30 wt %.

TABLE 10

| Composition of the inside of handle | Resin ratio by weight (wt %) | (A) Ratio by weigh of inorganic compound capable of dehydration at 150° C. or more (wt %) | (B) Reinforcing material | | |
|---|---|---|---|---|---|
| | | | Glass fiber ratio by weight (wt %) | Ceramic fiber ratio by weight (wt %) | Inorganic mineral ratio by weight (wt %) |
| Comparative example | 70 Polybutylene terephthalate | 0 | 30 | 0 | 0 |
| Limited range of composition | 65–80 | 30–15 | | 5–20 | |
| Sample 74 | 65 Polyacetal | 30 Calcium aluminate | 5 | 0 | 0 |
| Sample 75 | 65 Polyacetal | 15 Calcium aluminate | 20 | 0 | 0 |
| Sample 76 | 80 Polyacetal | 15 Calcium aluminate | 5 | 0 | 0 |
| Sample 77 | 70 Polyacetal | 20 Calcium aluminate | 10 | 0 | 0 |
| Sample 78 | 65 Polyacetal | 25 Calcium aluminate | 10 | 0 | 0 |

| Composition of the inside of handle | Results of short-circuit test | | Combustibility test |
|---|---|---|---|
| | Part appearance | Meg measured values (MΩ) | |
| Comparative example | Crack of damage None | 0.2 | HB |
| Limited range of composition | — | — | — |
| Sample 74 | Crack of damage None | 0.8 | Corresponding to HB |
| Sample 75 | Crack of damage None | 0.6 | Corresponding to HB |
| Sample 76 | Crack of damage None | 1.1 | Corresponding to HB |
| Sample 77 | Crack of damage None | 0.6 | Corresponding to HB |
| Sample 78 | Crack of damage None | 1.4 | Corresponding 10 HB |

A method for preparing samples will now be explained below. Firstly, polyacetal pellet (size 2.5 mm×length 2.5 mm), calcium aluminate, glass fiber, magnesium stearate (0.2 wt %) as a releasing agent, and a stabilizing agent (0.4 wt %) formalin were placed in a vinyl bag for manual, thorough mixing. The mixture was charged in a biaxial, triple thread milling extruder for kneading at 195° C. for 30 seconds. Taking the kneaded product from the biaxial, triple milling thread extruder, the product was cut while cooling in a water tank, to recover pellets of the organic and inorganic complex composition (size 1.5 to 2.5 mm×length 2.5 mm). Then, a handle composed of the pellets of the organic and inorganic complex composition was prepared.

The thus obtained handle was mounted on a circuit breaker, to carry out the shut-off test. After the shut-off test, the apparent state of the bases of the box was visually observed, and the meg measurement was carried out.

Consequently, as is apparently shown in Table 10, handles composed of the organic and inorganic complex compositions from samples 74 to 78 of the present invention had scarce damage under visual observation after the shut-off test, and their meg values were 0.5 MΩ or more, excellently. Using polyacetal polymer alloy instead of polyacetal, the same excellent results were obtained.

Explanation will follow about samples 79 to 85. Handles shown in FIG. 8 were prepared with the organic and inorganic complex compositions described in Tables 11. The resin was Nylon 6. The inorganic compound capable of dehydration at 250° C. or more was magnesium hydroxide. As the reinforcing material, glass fiber was used. As a comparative example, a handle composed of the composition with the content of a resin polybutylene terephthalate at 70 wt % and the content of the reinforcing material glass fiber at 30 wt %.

TABLE 11

| Composition of the inside of handle | Resin ratio by weight (wt %) | (A) Ratio by weigh of inorganic compound capable of dehydration at 150° C. or more (wt %) | (B) Reinforcing material | | |
|---|---|---|---|---|---|
| | | | Glass fiber ratio by weight (wt %) | Ceramic fiber ratio by weight (wt %) | Inorganic mineral ratio by weight (wt %) |
| Comparative example | 70 Polybutylene terephthalate | 0 | 30 | 0 | 0 |

TABLE 11-continued

| | | | | | |
|---|---|---|---|---|---|
| Limited range of composition | 45–80 | 50–15 | | 5–40 | |
| Sample 79 | 45 Nylon 6 | 50 Magnesium hydroxide | 5 | 0 | 0 |
| Sample 80 | 45 Nylon 6 | 1 5 Magnesium hydroxide | 40 | 0 | 0 |
| Sample 81 | 80 Nylon 6 | 15 Magnesium hydroxide | 5 | 0 | 0 |
| Sample 82 | 70 Nylon 6 | 20 Magnesium hydroxide | 10 | 0 | 0 |
| Sample 83 | 60 Nylon 6 | 25 Magnesium hydroxide | 15 | 0 | 0 |
| Sample 84 | 50 Nylon 6 | 30 Magnesium hydroxide | 20 | 0 | 0 |
| Sample 85 | 45 Nylon 6 | 25 Magnesium hydroxide | 30 | 0 | 0 |

| Composition of the inside of handle | Results of short-circuit test | | |
|---|---|---|---|
| | Part appearance | Meg measured values (MΩ) | Combustibility test |
| Comparative example | Crack of damage None | 0,2 | HB |
| Limited range of composition | — | — | — |
| Sample 79 | Crack of damage None | 4 | Corresponding to V-2 |
| Sample 80 | Crack of damage None | 0.6 | Corresponding to HB |
| Sample 81 | Crack of damage None | 0.6 | Corresponding to HB |
| Sample 82 | Crack of damage None | 0.8 | Corresponding to HB |
| Sample 83 | Crack of damage None | 0.6 | Corresponding to HB |
| Sample 84 | Crack of damage None | 0.9 | Corresponding to HB |
| Sample 85 | Crack of damage None | 0.8 | Corresponding to HB |

A method for preparing samples will now be explained below. Firstly, Nylon 6 pellets (size 2.5 mm×length 2.5 mm), magnesium hydroxide, glass fiber, magnesium stearate (0.2 wt %) as a releasing agent, and a stabilizing agent (0.4 wt %) were placed in a vinyl bag for manual thorough mixing. The mixture was charged in a biaxial, triple thread milling extruder for kneading at 255° C. for 30 seconds. Taking the kneaded product from the biaxial, triple thread milling extruder, the product was cut while cooling in a water tank, to recover pellets of the organic and inorganic complex composition (size 1.5 to 2.5 mm×length 2.5 mm). Then, a handle composed of the pellets of the organic and inorganic complex composition was prepared.

The thus obtained handle was mounted on a circuit breaker, to carry out the shut-off test. After the shut-off test, the apparent state of the bases of the box was visually observed and the meg measurement was carried out.

Consequently, as is apparently shown above in Table 11, handles composed of the organic and inorganic complex compositions from samples 74 to 78 of the present invention had scarce damage under visual observation after the shut-off test, and their meg values were 0.5 MΩ or more, excellently. Using any of polybutylene terephthalate, Nylon MXD 6, the polymer alloy thereof instead of the Nylon, the same excellent results were obtained.

Explanation will follow about samples 86 to 96. Handles shown in FIG. 8 were prepared with the organic and inorganic complex compositions described in Tables 12. The resin was Nylon 46. The inorganic compound capable of dehydration at 340° C. or more was calcium aluminate. As the reinforcing material, glass fiber was used. As a comparative example, a handle composed of the composition with the content of a resin polybutylene terephthalate at 70 wt % and the content of the reinforcing material glass fiber at 30 wt %.

TABLE 12

| Composition of the inside of handle | Resin ratio by weight (wt %) | (A) Ratio by weigh of Inorganic compound capable of dehydration at 150° C. or more (wt %) | (B) Reinforcing material | | |
|---|---|---|---|---|---|
| | | | Glass fiber ratio by weight (wt %) | Ceramic fiber ratio by weight (wt %) | Inorganic mineral ratio by weight (wt %) |
| Comparative example | 70 Polybutylene terephlhalate | 0 | 30 | 0 | 0 |

TABLE 12-continued

| | | | | | |
|---|---|---|---|---|---|
| Limited range of composition | 35–80 | 60–15 | 5–50 | | |
| Sample 36 | 35 Nylon 46 | 60 Calcium hydroxide | 5 | 0 | 0 |
| Sample 87 | 35 Nylon 46 | 15 Calcium hydroxide | 50 | 0 | 0 |
| Sample 88 | 80 Nylon 46 | 15 Calcium hydroxide | 5 | 0 | 0 |
| Sample 89 | 70 Nylon 46 | 20 Calcium hydroxide | 10 | 0 | 0 |
| Sample 90 | 60 Nylon 46 | 25 Calcium hydroxide | 15 | 0 | 0 |
| Sample 91 | 51 Nylon 46 | 35 Calcium hydroxide | 15 | 0 | 0 |
| Sample 92 | 40 Nylon 46 | 35 Calcium hydroxide | 20 | 0 | 0 |
| Sample 93 | 40 Nylon 46 | 50 Calcium hydroxide | 10 | 0 | 0 |
| Sample 94 | 40 Nylon 46 | 40 Calcium hydroxide | 20 | 0 | 0 |
| Sample 95 | 40 Nylon 46 | 30 Calcium hydroxide | 30 | 0 | 0 |
| Sample 96 | 40 Nylon 46 | 20 Calcium hydroxide | 40 | 0 | 0 |

| Composition of the inside of handle | Results of short-circuit test | | |
|---|---|---|---|
| | Part appearance | Meg measured values (MΩ) | Combustibility test |
| Comparative example | Crack of damage None | 0.2 | HB |
| Limited range of composition | — | — | — |
| Sample 36 | Crack of damage None | 5.5 | Corresponding to V-2 |
| Sample 87 | Crack of damage None | 1 | Corresponding to HB |
| Sample 88 | Crack of damage None | 0.8 | Corresponding to HB |
| Sample 89 | Crack of damage None | 1.1 | Corresponding to HB |
| Sample 90 | Crack of damage None | 1.1 | Corresponding 10 HB |
| Sample 91 | Crack of damage None | 1 | Corresponding to HB |
| Sample 92 | Crack of damage None | 0.9 | Corresponding to HB |
| Sample 93 | Crack of damage None | 2.5 | Corresponding to V-2 |
| Sample 94 | Crack of damage None | 1.8 | Corresponding to HB |
| Sample 95 | Crack of damage None | 1.4 | Corresponding to HB |
| Sample 96 | Crack of damage None | 1 | Corresponding to HB |

A method for preparing samples will now be explained below. Firstly, Nylon 46 pellets (size 2.5 mm×length 2.5 mm), calcium aluminate, glass fiber, magnesium stearate (0.2 wt %) as a releasing agent, and a stabilizing agent (0.4 wt %) were placed in a vinyl bag for manual, sufficient mixing. The mixture was charged in a biaxial, triple thread milling extruder for kneading at 330° C. for 30 seconds. Taking the kneaded product from the biaxial, triple thread milling extruder, the product was cut while cooling in a water tank, to recover pellets of the organic and inorganic complex composition (size 1.5 to 2.5 mm×length 2.5 mm). Then, a handle composed of the pellets of the organic and inorganic complex composition was prepared.

The thus obtained handle was mounted on a circuit breaker, to carry out the shut-off test. After the shut-off test, the apparent state of the bases of the box was visually observed and the meg measurement was carried out.

Consequently, as is apparently shown above in Table 12, handles composed of the organic and inorganic complex compositions from samples 86 to 96 of the present invention had scarce damage under visual observation after the shut-off test, and their meg values were 0.5 MΩ or more, excellently. Using any of polyphenylene sulfide, Nylon 6T, Nylon 66, polyethylene terephthalate, and the polymer alloy thereof instead of Nylon 46, the same excellent results were obtained.

What is claimed is:

1. A switch comprising (a) a box composed of a base and a cover, (b) mobile contacts individually contacting with and separating from fixed joints of individual electrodes, (c) an opening and closing part which opens and closes the mobile contacts, (d) a cross bar which supports the mobile contacts, and (d) a device for extinguishing arc generated between the mobile contracts and the fixed joints which comprises an arc extinguishing board, said base being molded from an organic and inorganic complex composition, and a structural composition, said organic and inorganic complex composition comprising a resin and one or more inorganic compounds capable of dehydration at 150° C. or more, said structural composition comprising a resin and one or more reinforcing materials, wherein the one or more inorganic compounds in said organic and inorganic complex composition generate a gas to provide insulation when arc is generated in the switch.

2. The switch according to claim 1, wherein said complex composition comprises a thermoplastic resin, one or more inorganic compounds capable of dehydration at 250° C. or more, and one or more reinforcing materials.

3. The switch according to claim 2, wherein said thermoplastic resin is Nylon 6, and said inorganic compound is magnesium hydroxide.

4. The switch according to claim 2, wherein said base comprises a part disposed at a periphery of the mobile contacts, and wherein the peripheral part is formed from said complex composition.

5. The switch according to claim 4, which is formed by placing said complex composition at a position corresponding to the peripheral part of a contact in a mold for compact molding, placing said structural composition at other parts in the mold, and subjecting both compositions to compact molding.

6. The switch according to claim 2, which comprises three electrodes, and said base comprises three parts disposed at a periphery of the electrodes, wherein the peripheral part of the central electrode is formed from said complex composition.

7. The switch according to claim 2, which is formed by dividing the structural composition into pieces and positioning said pieces for molding.

8. The switch according to claim 1, wherein said structural composition comprises a thermosetting resin or a thermoplastic resin, and glass fiber.

9. The switch according to claim 8, wherein said thermosetting resin is an unsaturated polyester.

10. The switch according to claim 8, wherein said thermoplastic resin is polyethylene terephthalate or Nylon 6.

11. The switch according to claim 1, wherein said base comprises an electric power supply side and a side opposite of said electric power supply side, wherein the electric power supply side is formed from said complex composition and the side opposite of the electric power supply side is formed from said structural composition.

12. The switch according to claim 11, wherein said electric power supply side is formed from the complex composition and the side opposite of the electric power supply side is formed from the structural composition by two-color injection molding.

13. The switch according to claim 12, wherein said complex composition and said structural composition comprise a thermosetting resin.

14. The switch according to claim 1, which is formed by placing said complex composition in the form of a sheet in a bottom mold, mounting said structural composition in the form of a sheet thereon, and subjecting both compositions to compact molding to form an article composed of an inner side of the base comprising the complex composition and an outward side of the base comprising the structural composition.

15. The switch according to claim 1, wherein said device for extinguishing arc further comprises an arc extinguishing side board between the box and the arc generated.

16. The switch according to claim 1, wherein said switch is multi-pole circuit breaker having the mobile contacts supported by the cross bar.

17. A switch comprising (a) a box composed of a base and a cover, (b) mobile contacts individually contacting with and separating from fixed joints of individual electrodes, (c) an opening and closing part which opens and closes the mobile contacts, (d) a cross bar which supports the mobile contacts, and (d) a device for extinguishing arc generated between the mobile contracts and the fixed joints which comprises an arc extinguishing board, said cross bar being molded from an organic and inorganic complex composition, and a structural composition, said organic and inorganic complex composition comprising a resin and one or more inorganic compounds capable of dehydration at 150° C. or more, said structural composition comprising a resin and one or more reinforcing materials, wherein the one or more inorganic compounds in said organic and inorganic complex composition generate a gas to provide insulation when arc is generated in the switch.

18. The switch according to claim 17, wherein the resin in said complex composition is a thermoplastic resin and said inorganic compound is one capable of dehydration at 250° C. or more.

19. The switch according to claim 18, wherein said thermoplastic resin is Nylon 6 and said inorganic compound is magnesium hydroxide.

20. The switch according to claim 17, wherein said cross bar is formed by transfer molding.

* * * * *